US007513436B2

(12) United States Patent
Schuessler et al.

(10) Patent No.: US 7,513,436 B2
(45) Date of Patent: Apr. 7, 2009

(54) APPARATUS AND METHODS FOR OPTICAL REPRESENTATIONS OF RADIO FREQUENCY IDENTIFICATION TAG INFORMATION

(75) Inventors: Frederick Schuessler, Baiting Hollow, NY (US); Anne Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 162 days.

(21) Appl. No.: 11/362,762

(22) Filed: Feb. 28, 2006

(65) Prior Publication Data
US 2007/0001006 A1    Jan. 4, 2007

Related U.S. Application Data

(60) Provisional application No. 60/694,973, filed on Jun. 30, 2005.

(51) Int. Cl.
*G06K 19/06* (2006.01)
(52) U.S. Cl. ...................... 235/492; 235/440
(58) Field of Classification Search .............. None
See application file for complete search history.

(56) References Cited

U.S. PATENT DOCUMENTS 5,128,520 A * 7/1992 Rando et al. ............ 235/375
5,329,105 A * 7/1994 Klancnik et al. ........ 235/462.16
6,321,986 B1 * 11/2001 Ackley .................. 235/462.01
6,371,375 B1 * 4/2002 Ackley et al. .......... 235/462.45
2005/0036620 A1 * 2/2005 Casden et al. ............ 380/259
2005/0071234 A1 * 3/2005 Schon ...................... 705/22
2005/0258238 A1 * 11/2005 Chapman ................ 235/380

OTHER PUBLICATIONS

"EPC™ Tag Data Standards, Version 2.0, Rev. 1.0, Standard Specification," EPCglobal®, 93 pages (May 11, 2005).
Netflix Mailers, Business 2.0 on CNNMoney.com, which was available on Jun. 13, 2007 at http://money.cnn.com/popups/2006/biz2/netflix/frameset.exclude.html, 1 page.

* cited by examiner

*Primary Examiner*—Daniel A Hess

(57) ABSTRACT

Methods, systems, and apparatuses for reconstitution of data for failed radio frequency identification (RFID) tags are described. The tag's information is segmented, optionally compressed, and encoded into a plurality of optical representations. Alternatively, or in addition, a portion or all of the tag's information is stored in a non-optical format. Upon failure of a tag read for any reason (e.g., tag failure, reader failure, operator error, environmental reasons, etc.), the data is reconstituted from the optical representations. Alternatively, or in addition, the reconstitution includes incorporating the information stored in a non-optical format.

43 Claims, 25 Drawing Sheets

1310

| Tag Section | CRC-16 | PC Bits | Header | Filter Value | Partition | SKU | | Serial Number |
|---|---|---|---|---|---|---|---|---|
| | | | | | | Company Prefix | Item Reference | |
| # bits | 16 | 16 | 8 | 3 | 3 | 20 - 40 | 24 - 4 | 38 |
| digits | 5 | 5 | 3 | 1 | 1 | 6 - 12 | 7 - 1 | 12 |
| notes | Tag calcs at s/u | | Data std. | (Refer to Table 1320) | (Refer to Table 1330) | Varies (Table 1330) | Varies (Table 1330) | |
| | | | | | | 13 digits / 44 bits | | |

| Type | Binary Value |
|---|---|
| All Others | 000 |
| Retail Consumer Trade Item | 001 |
| Standard Trade Item Grouping | 010 |
| Single Shipping/ Consumer Trade Item | 011 |
| Reserved | 100 - 111 |

| Partition Value | Company Prefix | | Item Reference | |
|---|---|---|---|---|
| | Bits | Digits | Bits | Digits |
| 0 | 40 | 12 | 4 | 1 |
| 1 | 37 | 11 | 7 | 2 |
| 2 | 34 | 10 | 10 | 3 |
| 3 | 30 | 9 | 14 | 4 |
| 4 | 27 | 8 | 17 | 5 |
| 5 | 24 | 7 | 20 | 6 |
| 6 | 20 | 6 | 24 | 7 |

| Case # | PC bits (hex) | Hdr (hex) | Fltr | Part-ition | SKU | Serial Number |
|---|---|---|---|---|---|---|
| 1 | 3000 | 30 | 2 | 5 | 1 0012345 00012c | 2101 |
| 2 | 3000 | 30 | 2 | 5 | 1 0012345 00012c | 2102 |
| 3 | 3000 | 30 | 2 | 5 | 1 0012345 00012c | 2107 |
| 4 | 3000 | 30 | 2 | 5 | 1 0012345 98765c | 50101 |
| 5 | 3000 | 30 | 2 | 5 | 1 0012345 98765c | 52102 |
| 6 | 3000 | 30 | 2 | 5 | 1 0012345 98765c | 52103 |
| 7 | 3000 | 30 | 2 | 5 | 1 0012345 98765c | 52107 |
| 8 | 3000 | 30 | 2 | 5 | 1 0012345 98765c | 103225 |
| 9 | 3000 | 30 | 2 | 5 | 1 0012345 98765c | 123226 |
| 10 | 3000 | 30 | 2 | 5 | 1 0012345 98765c | 233227 |
| 11 | 3000 | 30 | 2 | 5 | 1 0012345 98765c | 243228 |
| 12 | 3000 | 30 | 0 | 4 | 2 02345678 1234c | 12345678901 |

| Section Name | Element Name | # of digits | Notes |
|---|---|---|---|
| MDC Format | | | |
| | Type | 1 | Identifies different MDC schemes |
| | Truncated S/N | 1 | How many digits left off of S/Ns |
| Bit Defaults | | | |
| | PC bits | 5 | |
| | Header | 3 | |
| | Filter | 1 | |
| | Partition | 1 | |
| S/N defaults | | | |
| | S/N leading 0's | 1 | |
| Item Entry 0 | | | |
| | Item Start (IS) | 1+N | N depends on Table 1430 |
| | SKU | 0..13 | Depends on Table 1430 |
| | S/N Start (SS) | 0..2 | Depends on Table 1440 |
| | S/N data | 0..12 | |
| Item Entry 1..N | | | [repeats item entry 0 format] |

| Current tag string compared to prior tag string | Item Start Value | SKU digits | S/N Start digit | N extra digits |
|---|---|---|---|---|
| Same filter, partition, header, PC bits; Same SKU; New S/N. | 0 | 0 | Y | 0 |
| Same filter, partition, header, PC bits, Same SKU; Same encoded digits of previous S/N. | 1 | 0 | 0 | 0 |
| Same filter, partition, header, PC bits, Same SKU; New last digit of previous S/N. | 2 | 0 | 0 | 0 |
| Same filter, partition, header, PC bits; Same SKU; New last 2 digits of previous S/N. | 3 | 0 | 0 | 0 |
| Same filter, partition, header, PC bits; Same SKU; New last 3 digits of previous S/N. | 4 | 0 | 0 | 0 |
| Default filter, partition, header, PC bits; New Item Ref. (in SKU) | 5 | 13-CL | Y | 0 |
| Default filter, partition, header, PC bits; New SKU; New S/N. | 6 | 13 | Y | 0 |
| New partition; New SKU; New S/N. | 7 | 13 | Y | 1 |
| New filter; New partition; New SKU; New S/N. | 8 | 13 | Y | 2 |
| New filter, partition, header, PC bits; New SKU; New S/N. | 9 | 13 | Y | 10 |

*CL is the number of digits in the Company Prefix

| Number of Leading 0's and Trailing digits truncated | # of S/N digits encoded | S/N Start Digits | # of Trunc. Digits encoded |
|---|---|---|---|
| Default | 0 .. 7 | 0 ... 7 | 0 |
| Default | 8 .. 12 | 80 ... 84 | 0 |
| Not default | 0 .. 7 | 90 ... 97 | 2 (lead, trail) |
| Not default | 8 .. 12 | 85 .. 89 | 2 (lead, trail) |

| Fmt | Trunc | PC | Hdr | Filter | Partition | Lead 0s |
|---|---|---|---|---|---|---|
| 1 | 4 | 12288 | 048 | 2 | 5 | 6 |

|  | Uncompressed Case ID data ||| Compressed Data | # |
|---|---|---|---|---|---|
|  | F | P | GTIN (SKU) | S/N |  | dig |
| 1 | 2 | 5 | 1 0012345 00012c | 2101 | 6 1001234500012 2 00 | 17 |
| 2 | 2 | 5 | 1 0012345 00012c | 2102 | 1 | 1 |
| 3 | 2 | 5 | 1 0012345 00012c | 2107 | 1 | 1 |
| 4 | 2 | 5 | 1 0012345 98765c | 50101 | 5 98765 2 05 | 9 |
| 5 | 2 | 5 | 1 0012345 98765c | 52102 | 1 | 1 |
| 6 | 2 | 5 | 1 0012345 98765c | 52103 | 1 | 1 |
| 7 | 2 | 5 | 1 0012345 98765c | 52107 | 1 | 1 |
| 8 | 2 | 5 | 1 0012345 98765c | 103225 | 3 10 | 3 |
| 9 | 2 | 5 | 1 0012345 98765c | 123226 | 2 2 | 2 |
| 10 | 2 | 5 | 1 0012345 98765c | 233227 | 3 23 | 3 |
| 11 | 2 | 5 | 1 0012345 98765c | 243228 | 2 4 | 2 |
| 12 | 0 | 4 | 2 02345678 1234c | 12345678901 | 8 04 2023456781234 97 1 4 1234567 | 27 |
|  | Grand Total of Digits needed to encode the 12 Case ID's: ||||| 68 |

FIG. 14F

APPARATUS AND METHODS FOR OPTICAL REPRESENTATIONS OF RADIO FREQUENCY IDENTIFICATION TAG INFORMATION

This application claims the benefit of U.S. Provisional Application No. 60/694,973, filed Jun. 30, 2005, which is incorporated herein by reference in its entirety.

BACKGROUND OF THE INVENTION

1. Field of the Invention

The present invention relates to the optical representations of data contained on radio frequency identification (RFID) tag devices.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag can store a unique identification number. The tags respond to the reader transmitted read signals by providing their identification number, bit-by-bit, so that they can be identified.

Tags sometimes fail to respond to read requests for various reasons, including defects or damage to the tags, defects or damage to the reader, environmental reasons, etc. In such situations, it may be necessary for a human operator to hand-enter data printed on the failed tag into a system so that the tag can be identified. However, such a backup system for failed reads of tags is inefficient. Other backup systems may rely on a barcode containing the tag identification data. For example, the full serialized identifier provided by an Electronic Product Code (EPC) RFID tag requires more than 30 digits to be hand-entered or encoded onto a 1D or 2D barcode. Such barcodes are expensive and time consuming to print on demand and occupy a significant amount of space on the tag or tagged item.

Thus, what is needed is a cheaper, faster, more efficient, and reliable backup identification system for failed tags.

BRIEF SUMMARY OF THE INVENTION

Methods and apparatuses for optical representations of radio frequency identification (RFID) tag information are described.

In an embodiment of the invention, reconstituting radio frequency identification (RFID) tag data is performed by receiving a plurality of symbols associated with a RFID tag, resolving the plurality of symbols to generate a plurality of data elements, and generating a data string using the plurality of data elements. In an embodiment of the invention, the generation algorithm uses the data elements and internal data and data relationships to assemble the data string. In a further embodiment, the generation algorithm uses external data and data relationships to assemble the data string.

In a further embodiment, the plurality of symbols received includes at least one manually entered human readable symbol (HRS). In yet a further embodiment, the plurality of symbols received include at least one machine scanned machine readable symbol (MRS). In yet another embodiment, the plurality of symbols received include at least one scanned or manually entered combination symbol (CS). In yet a further embodiment, data is reconstituted from a plurality of symbols associated with a plurality of RFID tags into a plurality of data strings.

In an embodiment of the invention, only some of the original RFID tag information is reconstituted. In another embodiment, all of the RFID tag information in reconstituted. In a further embodiment, at least some of the RFID tag information is reconstituted along with additional information from at least one other source or algorithm.

In an embodiment of the invention, a data string associated with a RFID tag is encoded into symbols by segmenting the data string into a plurality of data elements, and encoding the data elements into a plurality of symbols. In another embodiment, at least one of the data elements is compressed. In a further embodiment, each data element is encoded into at least one symbol (HRS, MRS, or CS). In yet a further embodiment, multiple data strings are encoded into multiple symbols. In a further embodiment, the data elements from at least one data string are encoded into a plurality of representations comprising at least one Master Data Carrier (MDC) and at least one additional symbol.

Embodiments of the present invention include RFID tag devices. In an embodiment, a tag includes a substrate, an antenna on the substrate, and an electrical circuit on the substrate that includes identifying data for the RFID tag device. The electrical circuit is coupled to the antenna and is capable of backscatter transmitting data in response to a request from a reader. The tag further includes a plurality of associated symbols. Associated symbols are logically associated, but may be physically located in any location. In another embodiment, the tag further includes at least one MDC and at least one other associated symbol. The at least one MDC may be shared between tags; a set of multiple tags may be associated with the same at least one MDC. Other types of tags are also within the scope of the invention.

In an embodiment, each symbol associated with the tag is a MRS, a HRS, or a CS. In an embodiment, at least one MDC and at least one symbol are associated with the tag. In a further embodiment, the at least one MDC is also associated with at least one other tag.

Embodiments of the invention include an operation to reconstitute at least some of the data from a failed RFID tag. The item with the failed tag is located, and data associated with the failed tag is reconstituted and used. This process is equally applicable to a failed RFID reader or a failed read due to environmental problems. In other words, the failure is not necessarily a failure of the tag itself, but a loss for any reason of the ability to retrieve the information stored on the tag.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 7A:
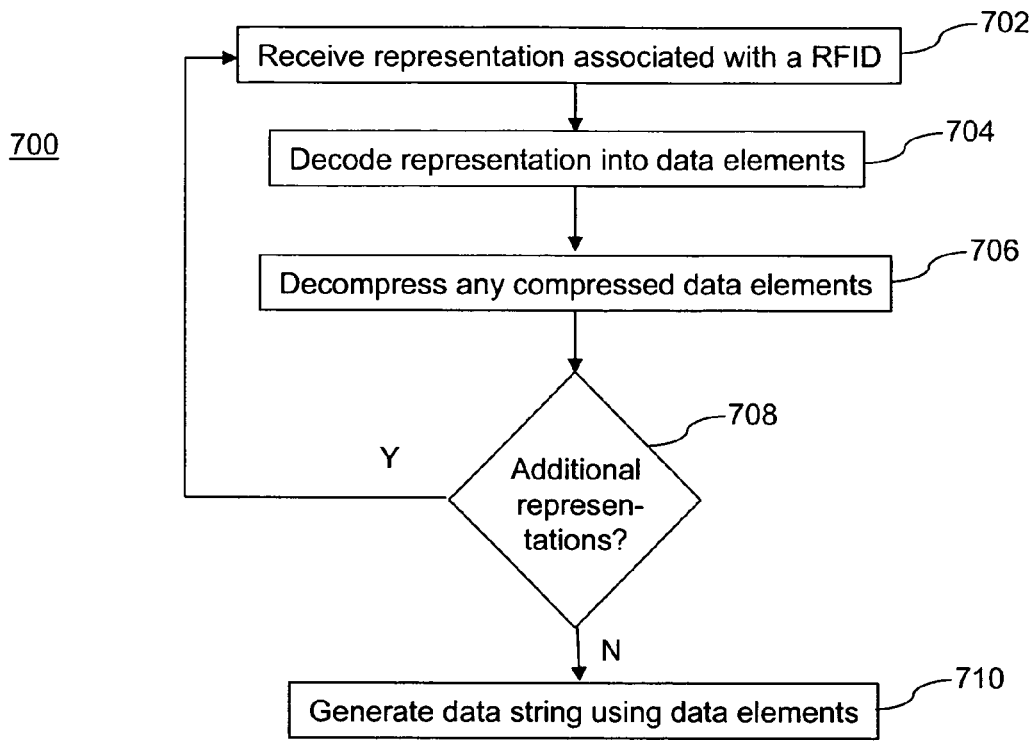
Figure 7B:
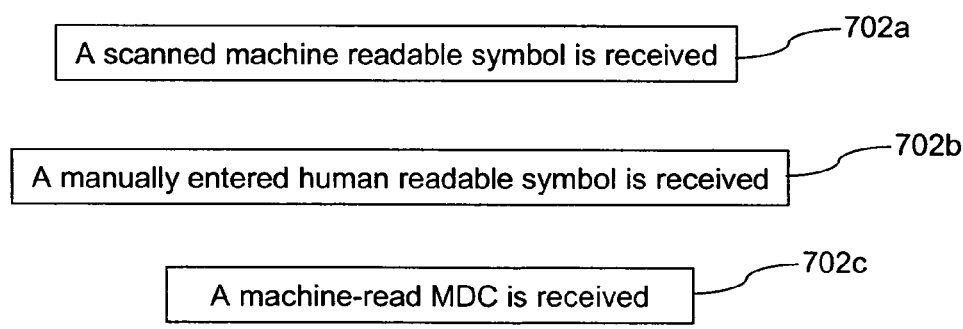
Figure 7C:
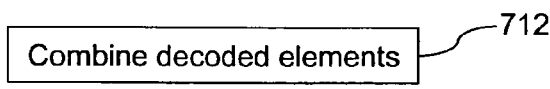

FIGS. 7A, 7B, and 7C show flowcharts providing example embodiments of the present invention for obtaining a data string from a plurality of symbols associated with a RFID tag.

Figure 8A:
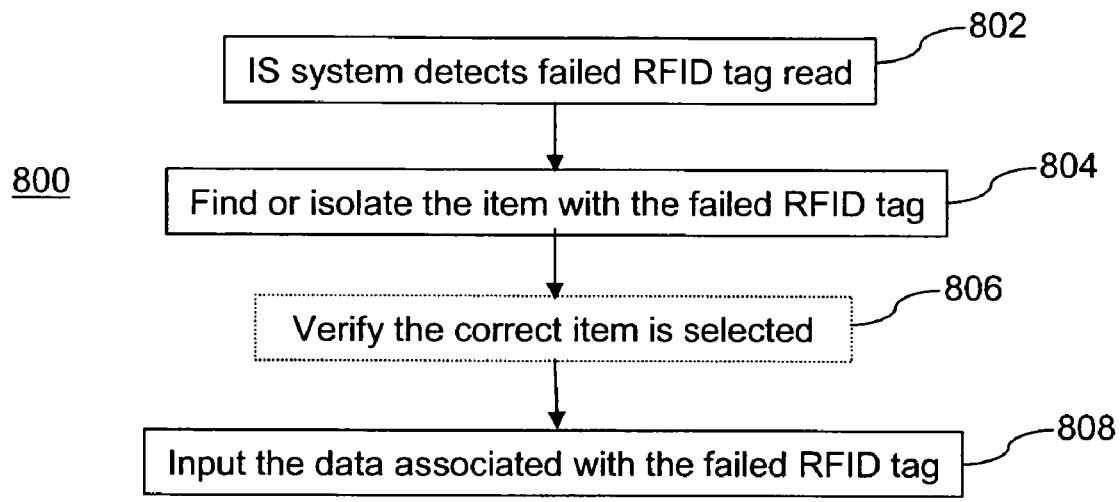
Figure 8B:
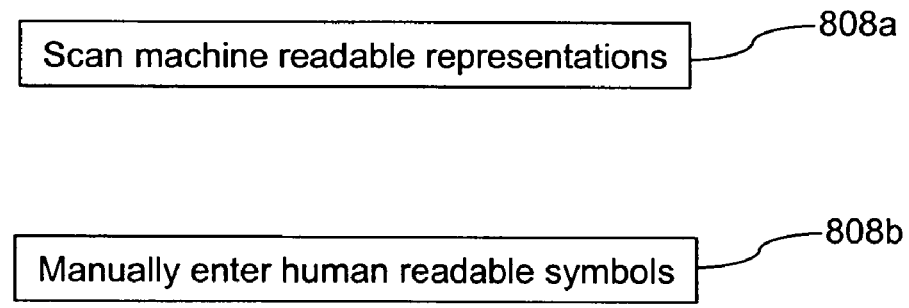

FIGS. 8A and 8B show flowcharts providing example embodiments of the present invention for locating an object with a failed RFID and entering the associated data.

Figure 9A:
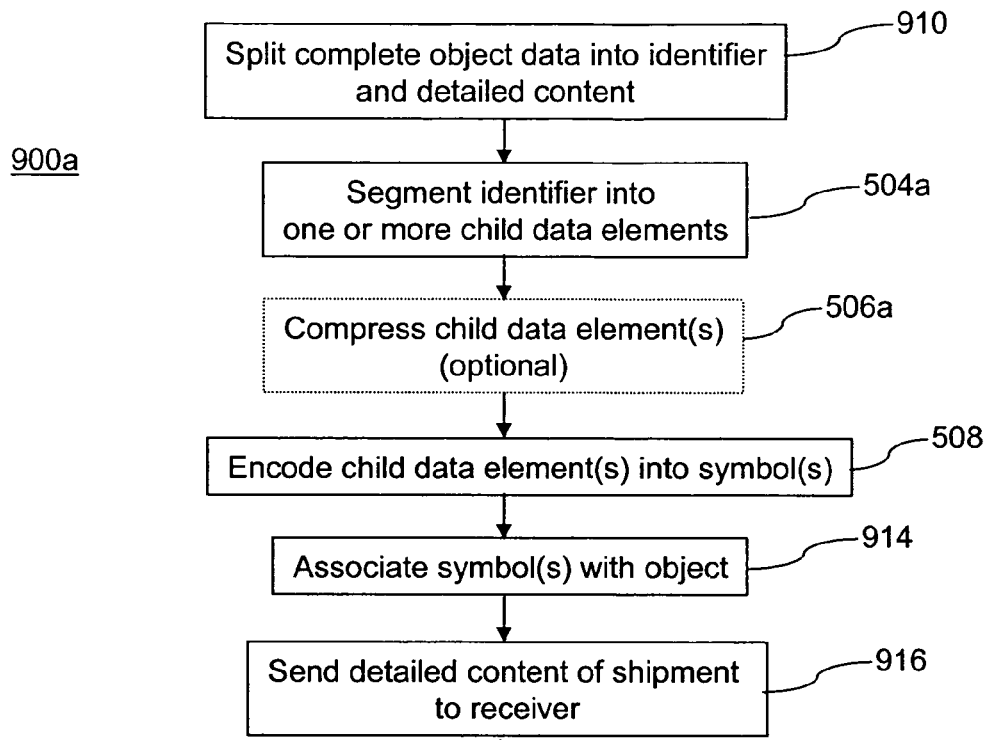
Figure 9B:
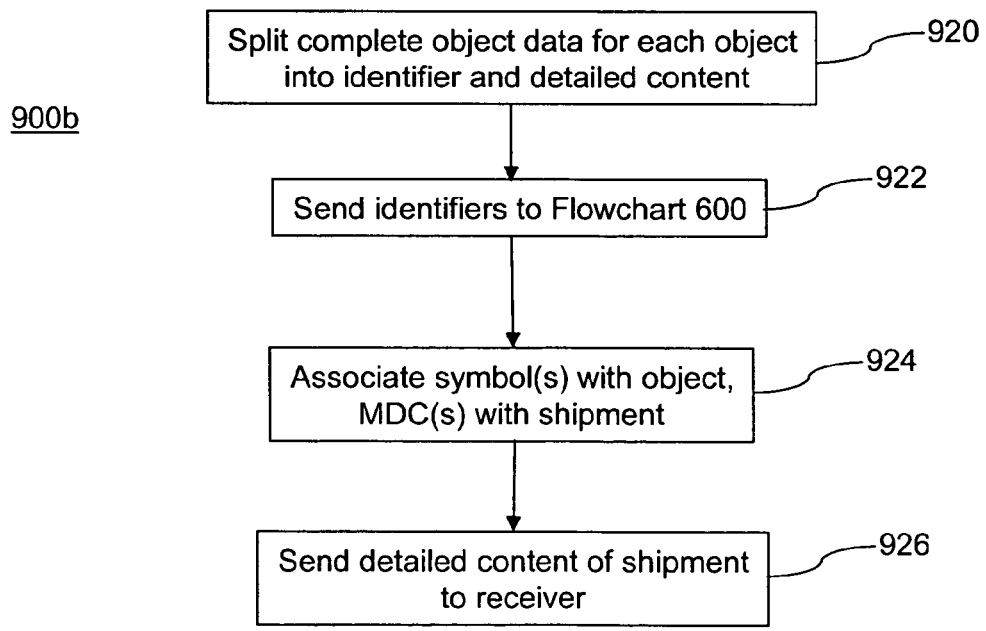
Figure 9C:
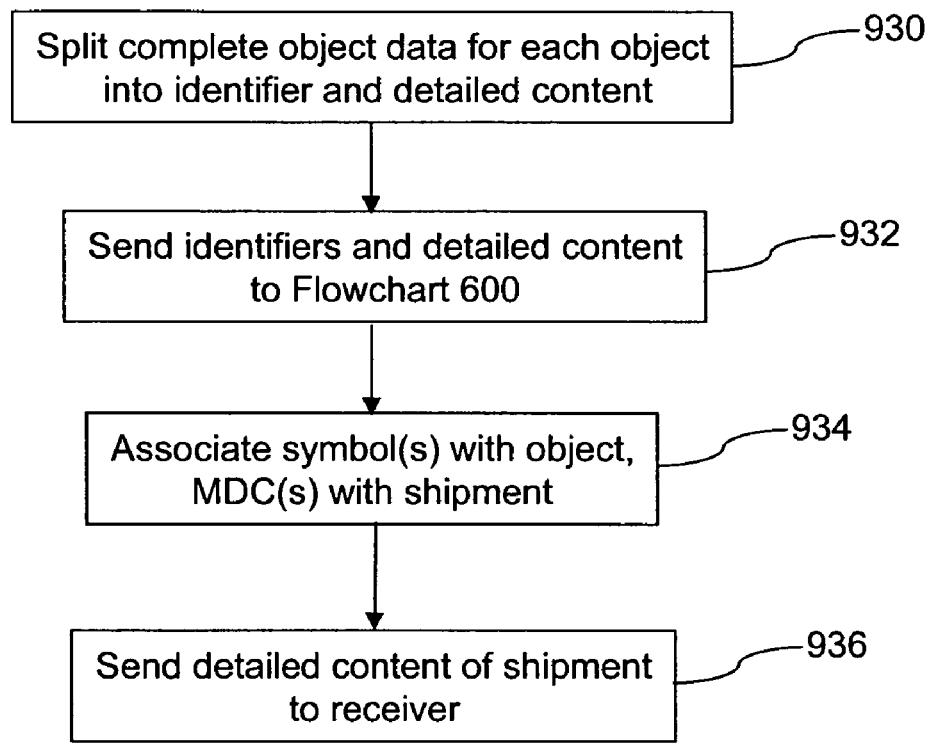

FIGS. 9A-9C show diagrams illustrating the use of example embodiments of the present invention for encoding tag data strings into representations and the transfer of data to the receiver's database.

Figure 10:
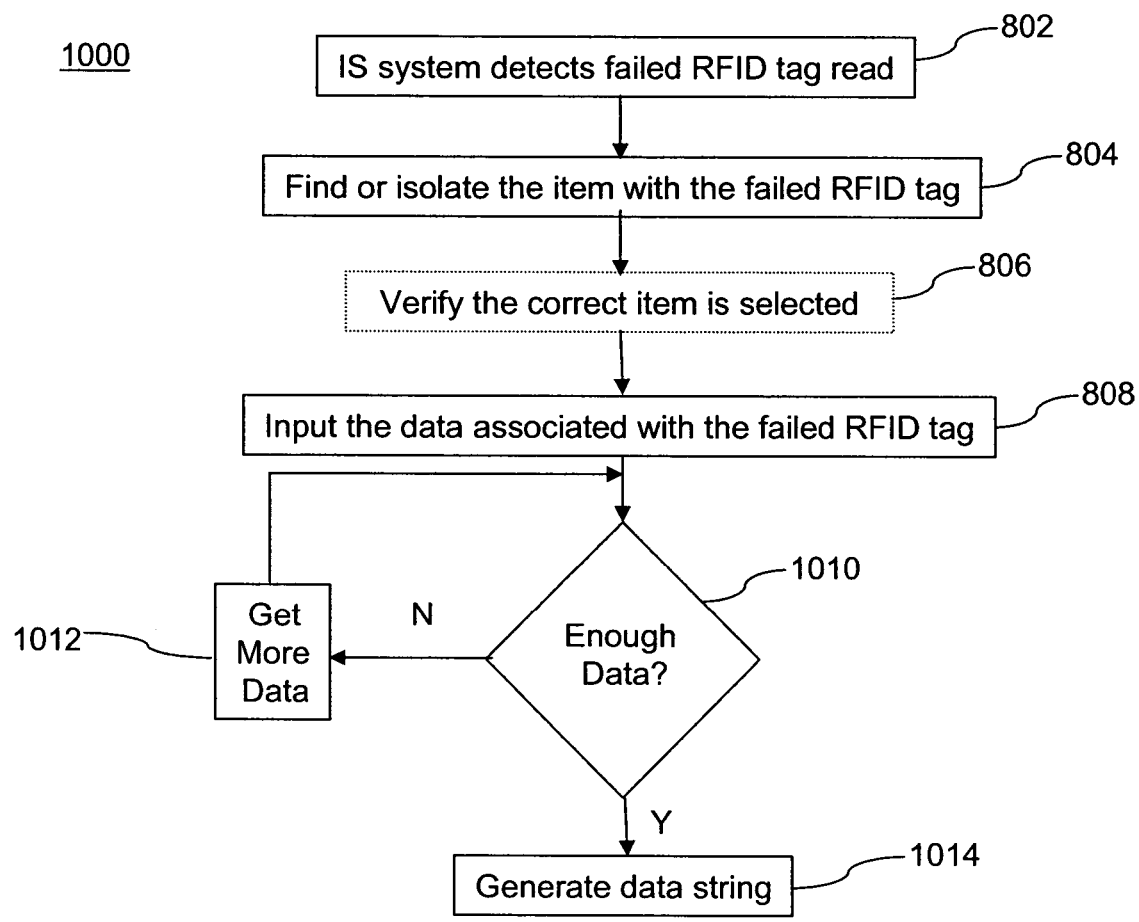

FIG. 10 shows a flowchart providing example embodiments of the present invention for generating a data string after a failed tag read.

Figure 11A:
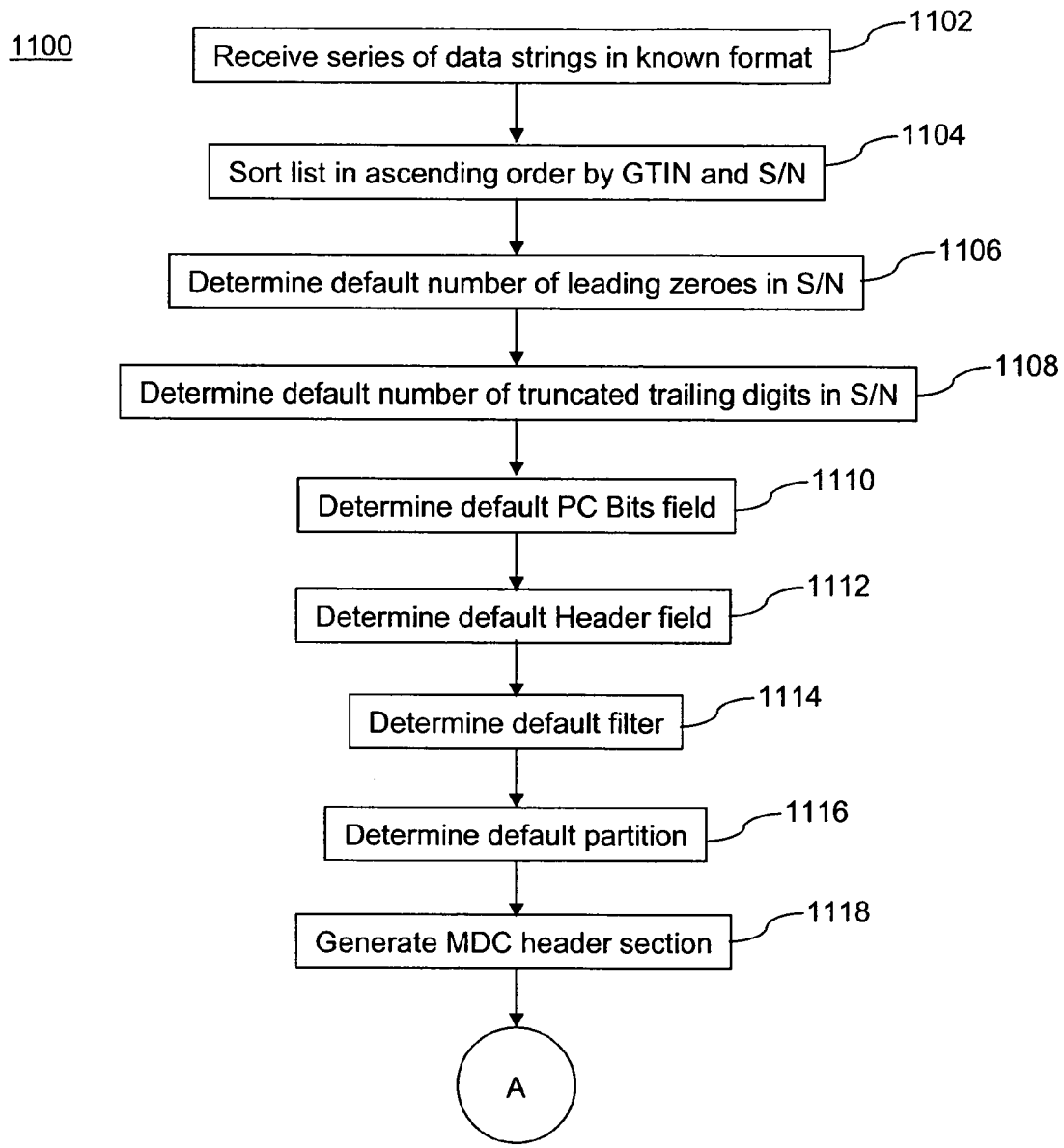
Figure 11B:
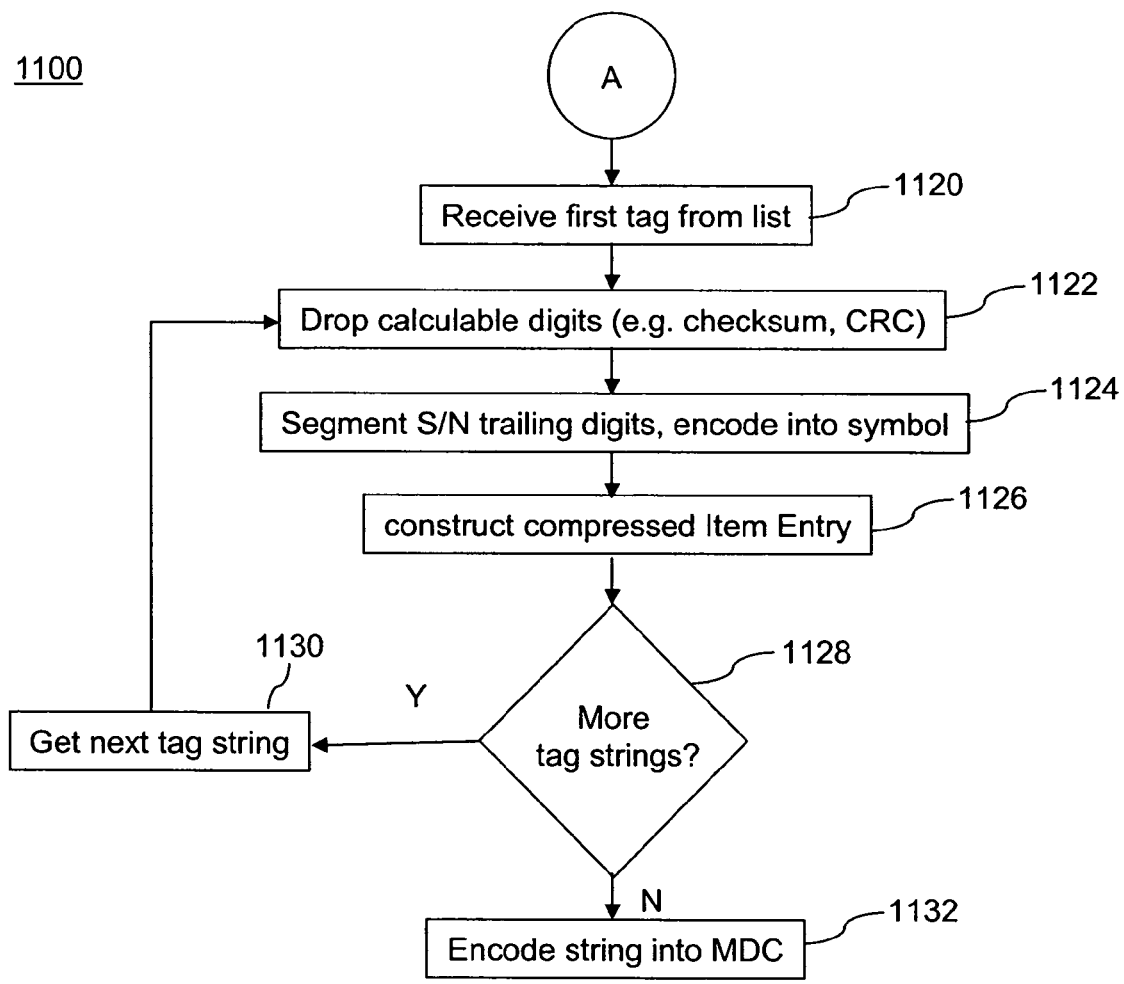
Figure 11C:
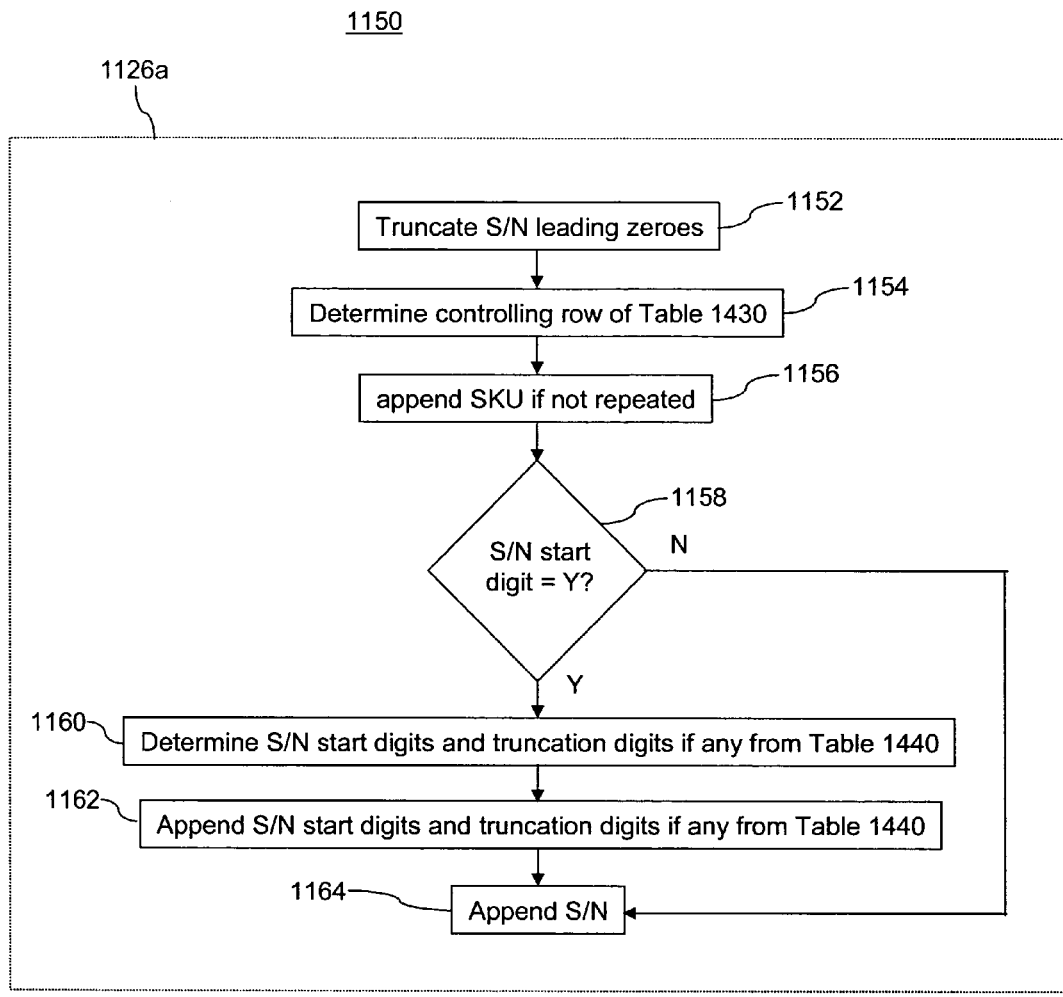

FIGS. 11A-11C show flowcharts providing example embodiments of the present invention for compressing master carrier data.

Figure 12A:
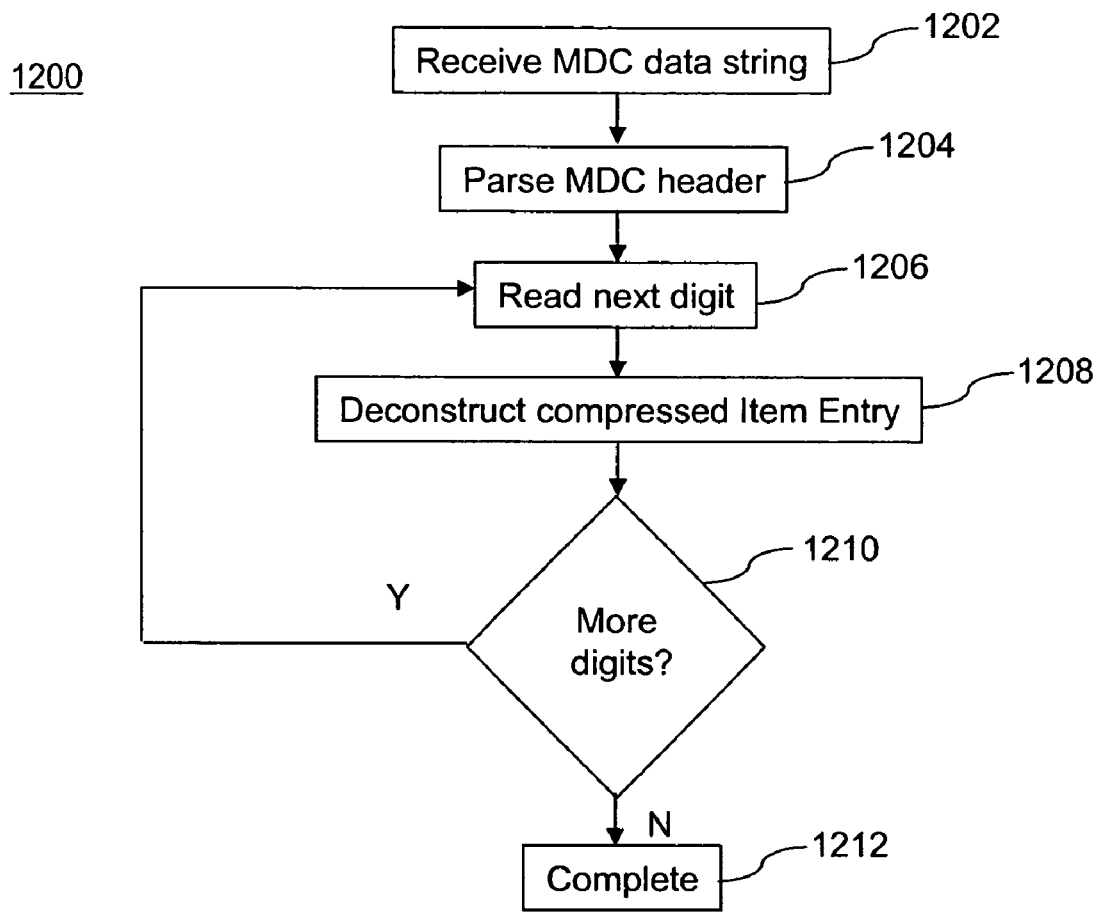
Figure 12B:
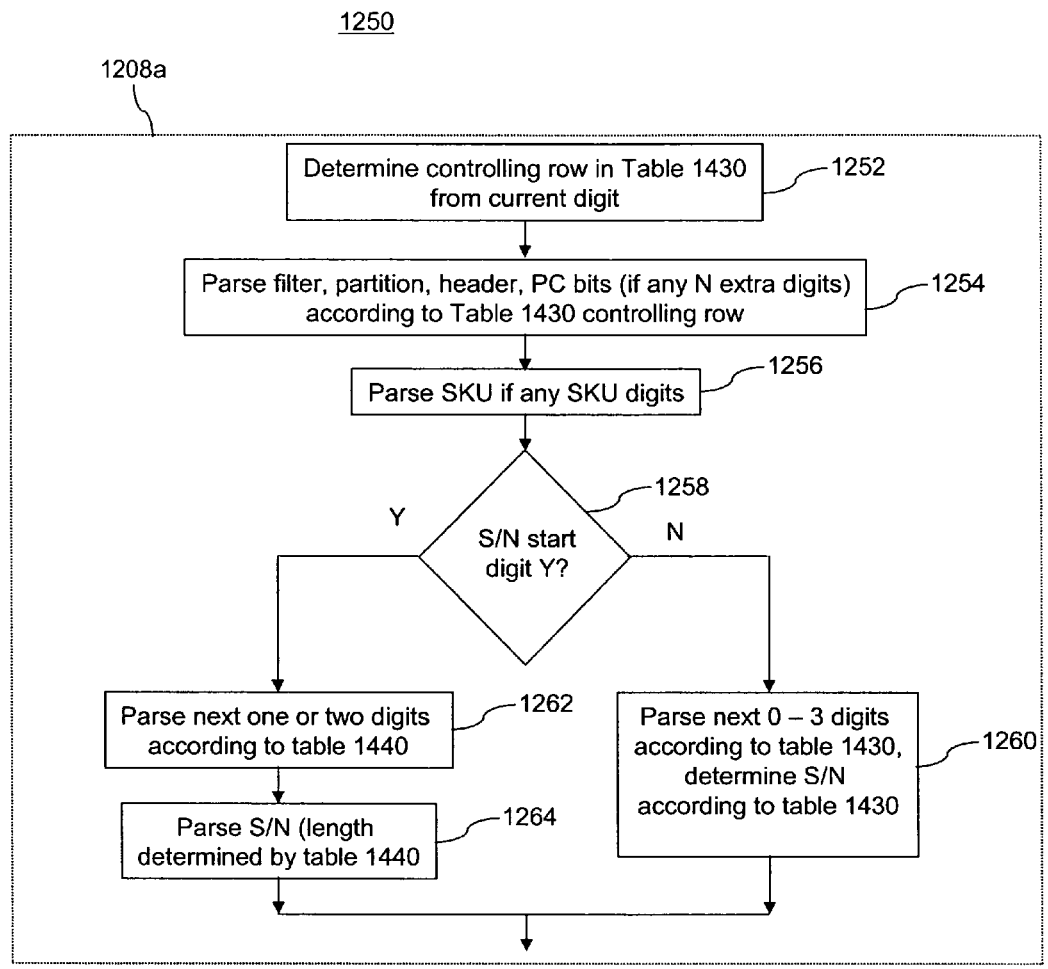

FIGS. 12A and 12B shows a flowchart providing an example embodiment of the present invention for decompressing master carrier data.

FIGS. 13A-13C show tables illustrating a simulated RFID tag data standard used to demonstrate embodiments of the invention.

FIGS. 14A-14F show tables illustrating an example embodiment of the present invention compressing master carrier data.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present invention relates to optical representations of data on radio frequency identification (RFID) tags. Furthermore, in embodiments, the present invention relates to the reconstitution of data for failed reads of RFID tags. The tag read may fail for any reason (e.g. failed tag, failed reader, other associated hardware or software failure, environmental reasons, operator error, etc.). According to an embodiment, a read of a tag is attempted. If the tag read fails, symbols associated with the tag are scanned or manually inputted to obtain data regarding the tag. Data for the tag is reconstituted from the scanned or inputted data.

In another embodiment, an attempted read of a tag associated with an object on a pallet is attempted. If the tag read fails, a symbol associated with multiple objects on the pallet and at least one symbol associated with the object are read and data for the failed tag is reconstituted.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Tag Embodiments

Figure 1:
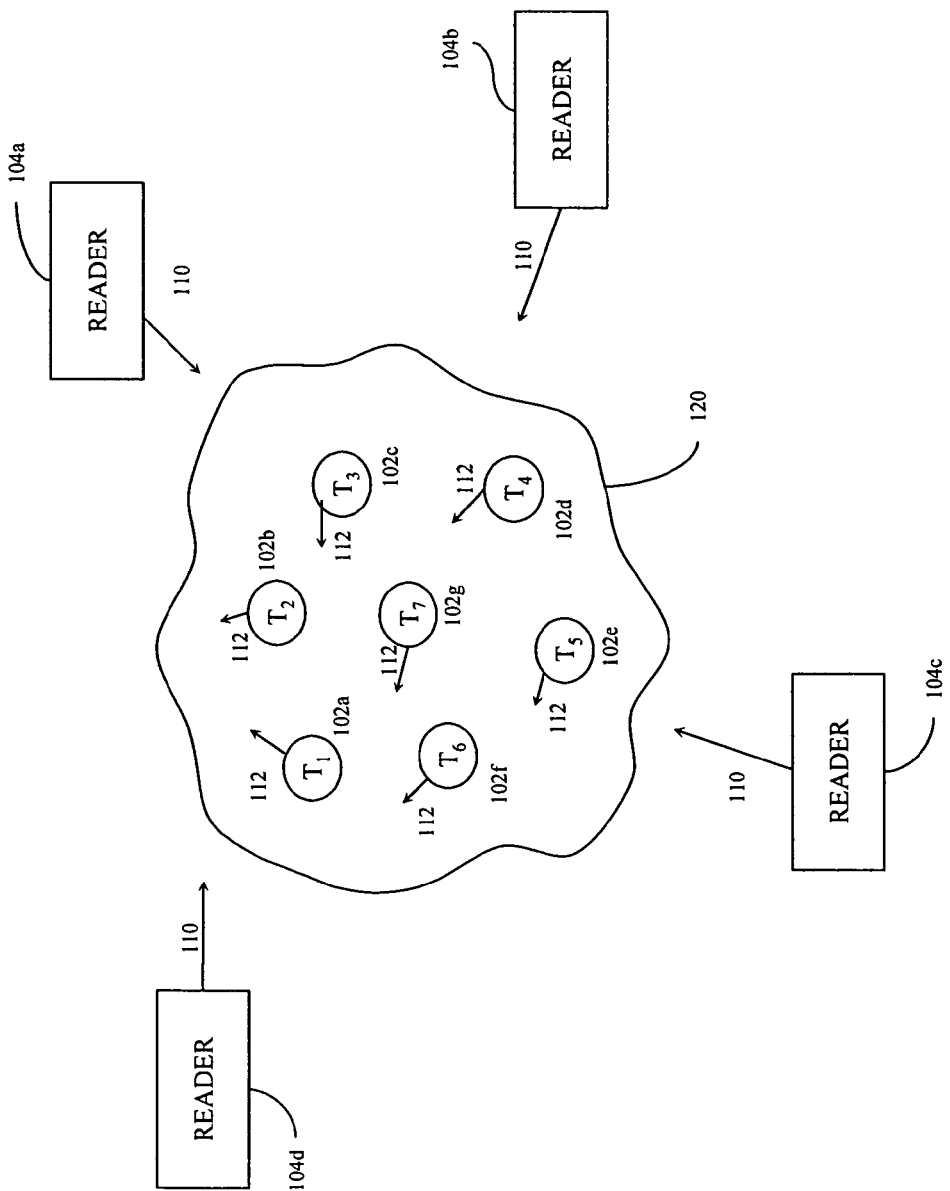
FIG. 1 illustrates an environment where RFID readers communicate with an exemplary population of RFID tags, according to an embodiment of the present invention.

Before describing embodiments of the present invention in detail, it is helpful to describe an example environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. According to embodiments of the present invention, a population 120 may include any number of tags 102. In some embodiments, very large numbers of tags 102 may be included in a population 120 of tags, including hundreds, thousands, or more.

Environment 100 also includes readers 104a-104d. Readers 104 may operate independently or may be coupled together to form a reader network. A reader 104 may be requested by an external application to address the population of tags 120. Alternatively, reader 104 may have internal logic that initiates communication, or may have a trigger mechanism that an operator of reader 104 uses to initiate communication.

As shown in FIG. 1, a reader 104 transmits an interrogation signal 110 having a carrier frequency to the population of tags 120. The reader 104 operates in one or more of the frequency bands allotted for this type of RF communication. For example, frequency bands of 902-928 MHz and 2400-2483.5 MHz have been defined for certain RFID applications by the Federal Communication Commission (FCC). Furthermore, due to regulatory or operational considerations, reader 104 may change carrier frequency on a periodic basis (e.g., ranging from 50 to 400 milliseconds) within the operational band. In these "frequency hopping" systems, the operational band is divided into a plurality of hopping channels. For example, the 902-928 MHz frequency band may be divided into 25 to 50 hopping channels, depending upon the maximum bandwidth defined for each hopping channel. The maximum allowable bandwidth for each hopping channel may be set by local or national regulations. For example, according to FCC Part 15, the maximum allowed bandwidth of a hopping channel in the 902-928 MHz band is 500 kHz. Each hopping channel is approximately centered around a specific frequency, referred to herein as the hopping frequency.

A frequency hopping reader hops between hopping frequencies according to a pseudorandom sequence. Each reader 104 typically uses its own pseudorandom sequence. Thus, at any one time, one reader 104a may be using the same or a different carrier frequency than another reader 104b.

Various types of tags 102 transmit one or more response signals 112 to an interrogating reader 104 in a variety of ways, including by alternatively reflecting and absorbing portions of signal 110 according to a time-based pattern or frequency. This technique for alternatively absorbing and reflecting signal 110 is referred to herein as backscatter modulation. Reader 104 receives response signals 112, and obtains data from response signals 112, such as an identification number of the responding tag 102.

Figure 2A:
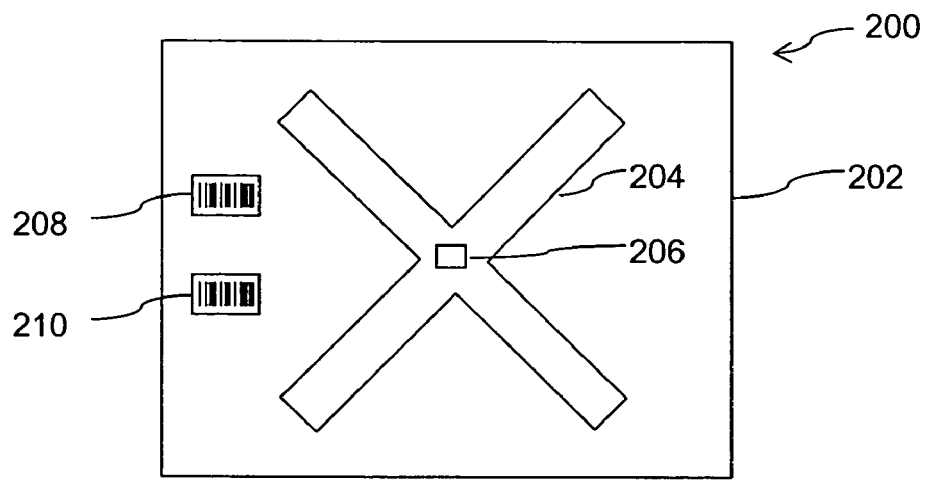
FIGS. 2A-2D show plan views of RFID tags, according to example embodiments of the present invention.

The present invention is applicable to any type of RFID tag. FIGS. 2A-2D show example plan views of a radio frequency identification (RFID) tag 200. Referring first to FIG. 2A, a tag 200 is shown, according to an example embodiment of the invention. Tag 200 includes a substrate 202, an antenna 204, and an integrated circuit (IC) 206. Antenna 204 is formed on a surface of substrate 202. Antenna 204 may include any number of one or more separate antennas. IC 206 includes one or more integrated circuit chips/dies, and can include other electronic circuitry. IC 206 is attached to substrate 202, and is coupled to antenna 204. IC 206 may be attached to substrate 202 in a recessed and/or non-recessed location. IC 206 controls operation of tag 200, and transmits signals to, and receives signals from RFID readers using antenna 204. Tag 200 may additionally include further elements, including an impedance matching network and/or other circuitry. The present invention is applicable to tag 200 (e.g., a semiconductor type tag), and to other types of tags, including surface wave acoustic (SAW) type tags.

Tag 200 may be affixed directly to, or may be associated with (e.g., located nearby), any item or object and/or container or other mount, support, or other structure associated with the item or object. Tag 200 may be any type of RFID electronic device that responds to wireless interrogations, including a loose tag, a hanging tag, and a label having a release liner for removal to attach the label to an item or object. Embodiments of the present invention can be implemented in a variety of environments, including warehouses, retail, logistics, healthcare, and any other environment.

As shown in FIG. 2A, tag 200 also includes a plurality of symbols—in this example, a first symbol 208 and a second symbol 210. As further described below, symbols 208 and 210 collectively contain information related to tag 200. For example, in an embodiment, data of symbols 208 and 210 can be combined to form an identification number stored in tag 200. For illustrative purposes, FIG. 2A shows only two symbols. However, in embodiments, any number of two or more symbols may be associated with tag 200, depending on the particular application. In the example embodiment of FIG. 2A, first and second symbols 208 and 210 are machine readable symbols (MRS) (e.g., bar codes).

Figure 2B:
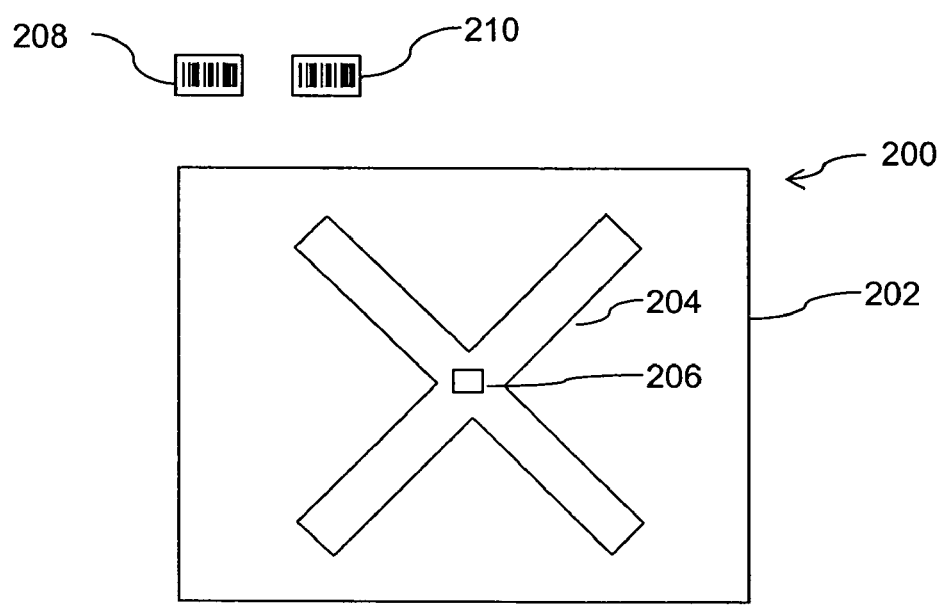

FIG. 2A shows symbols 208 and 210 associated with tag 200 as being physically located on tag 200. For example, symbols 208 and 210 may be printed or affixed to substrate 202 of tag 200. However, in other embodiments, one or more symbols associated with tag 200 may be otherwise positioned. For example, as illustrated in FIG. 2B, symbols 208 and 210 may be positioned nearby tag 200. In another example embodiment, symbols 208 and 210 may be present on a container or mount for tag 200 (and its associated object). Symbols are logically, and not necessarily physically, associated with a tag. There are no restrictions to the physical locations of symbols logically associated with a tag. In this example, Symbols 208 and 210 may be physically located anywhere.

Figure 2C:
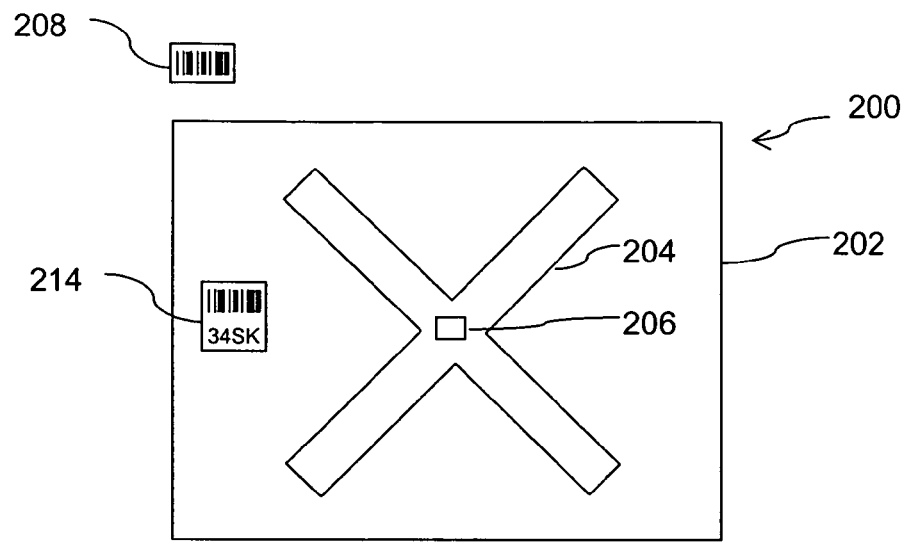

In an embodiment illustrated in FIG. 2C, a symbol 208 is positioned nearby a tag 200 and a symbol 214 is positioned on tag 200. Symbols 208 and 214 collectively contain information related to tag 200 of FIG. 2C. Symbol 214 is a combination symbol (CS) including both human readable elements (text "34SK" of symbol 214) and machine readable elements (bar code portion of symbol 214). In embodiments, symbols may be any combination of MRSs, human readable symbols (HRS), or combination symbols (CS). For example, as shown in FIG. 2C, tag 200 is associated with no HRSs, one MRS 208, and one CS 214.

Figure 2D:
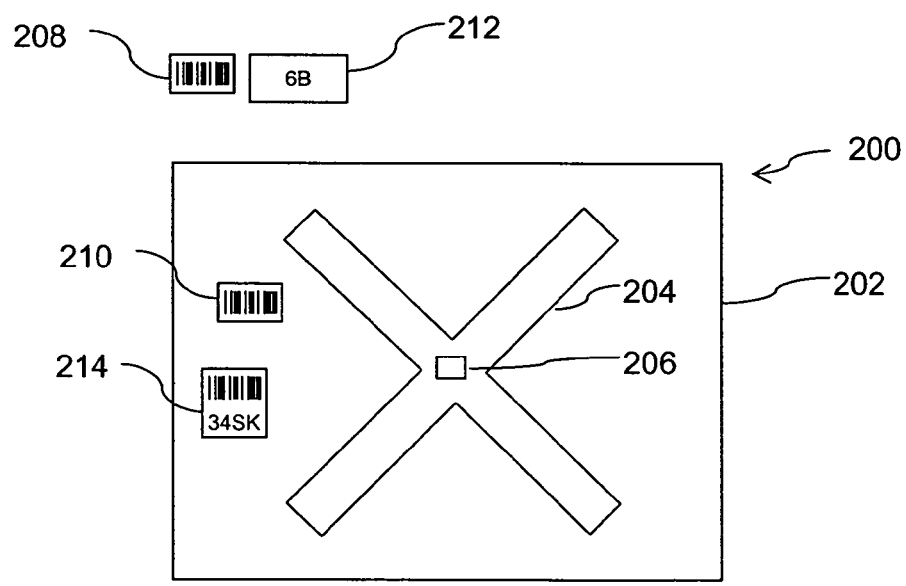

In an embodiment illustrated by FIG. 2D, a symbol 208 and a symbol 212 are positioned nearby a tag 200, while a symbol 210 and a symbol 214 are positioned on tag 200. Symbols 208, 210, 212, and 214 collectively contain information related to tag 200 of FIG. 2D. In the example illustrated by FIG. 2D, symbol 212 is a human readable symbol (HRS). The plurality of symbols associated with tag 200 in this example includes one HRS 212 and one MRS 208 located off of tag 200, and one MRS 210 and one CS 214 positioned on tag 200.

Thus, as shown in FIGS. 2A-2D, a plurality of symbols associated with tags 200 may be physically located on tag 200, off of tag 200, or any combination thereof. Furthermore, as described above, any combination of MRSs, HRSs, and CSs can be used to collectively represent information related to tag 200.

As described above, the symbols associated with a tag each contain data that can be combined to reconstitute information related to the tag. In an embodiment, the total data encoded in the plurality of symbols associated with a tag combines to represent the same data stored in the tag. For example, the data of the symbols can be combined to form the identification number stored in the tag. The symbols' data may likewise only represent a subset of the data stored on the tag. In another embodiment, the data encoded in the plurality of symbols associated with a tag may be partially or wholly different from that stored in the tag. For example, the symbol data may be combined to form tag failure data in addition to actual tag data to aid in tracking tag failure rates. In still another embodiment, the data encoded in the plurality of symbols may not combine to directly represent the data stored in tag 200, but may be indirectly related. For example, symbols may store fixed or variable length indirect references for certain tag data fields instead of uniquely and completely representing the data.

RFID tags can fail in undesirable numbers. One type of failure occurs when a tag does not respond to reader interrogations. Thus, according to embodiments of the present invention, a plurality of symbols (MRSs, HRSs, and CSs in any combination) serve as a backup in the event that tag 200 fails to respond to an interrogation for data by a reader. Thus, if a tag 200 fails to respond to a read request, information stored in that tag 200 (such as an identification number) may still be reconstituted from the combined data of the plurality of symbols. One skilled in the art will recognize that these data reconstitution techniques are equally applicable for any tag read failure. Embodiments of the invention are equally applicable to read failures due to the reader, associated equipment, the operator, the environment, etc., and are not limited to a failures of the tags themselves.

Information associated with an item that may be stored in a database (associated with the identification number) may also be obtained. Once the tag data has been reconstituted, this data may be further used to re-program or replace the RFID tag on the item. Conversely, in another embodiment, reconstituted data may simply be used as if it was read off of the tag itself and the tag is not replaced nor reprogrammed. In a further embodiment, only a subset of the data originally on the tag is reconstituted In embodiments, MRSs and CSs may include any type of machine readable symbology, including linear barcodes (e.g., UPC, EAN, Code 39, and Code 93i), multi-row or stacked barcodes (e.g., PDF-417 and Code 49), composite codes (e.g., EAN.UCC composite), and area or matrix codes (e.g., Code One, Vericode, Data Matrix, and MAXICODE). Symbols (MRSs, HRSs, and CSs) may be attached to or formed on tag 200, an object associated with tag 200, a pallet associated with tag 200, or any other item in any manner. Symbols may be attached to or formed on tags or any objects in any manner, including conventional ways such as printing or silk screening directly onto the tag, object, pallet, or other item, printing the symbols on labels (e.g., stickers) that are applied to the tag, object, pallet, or other item, or any other way. One or more symbols may be placed on a tag, object, pallet, or other item and the other symbols may be placed on the same or another tag, object, pallet, or other item.

Example Tagged Object Embodiments

Figure 3A:
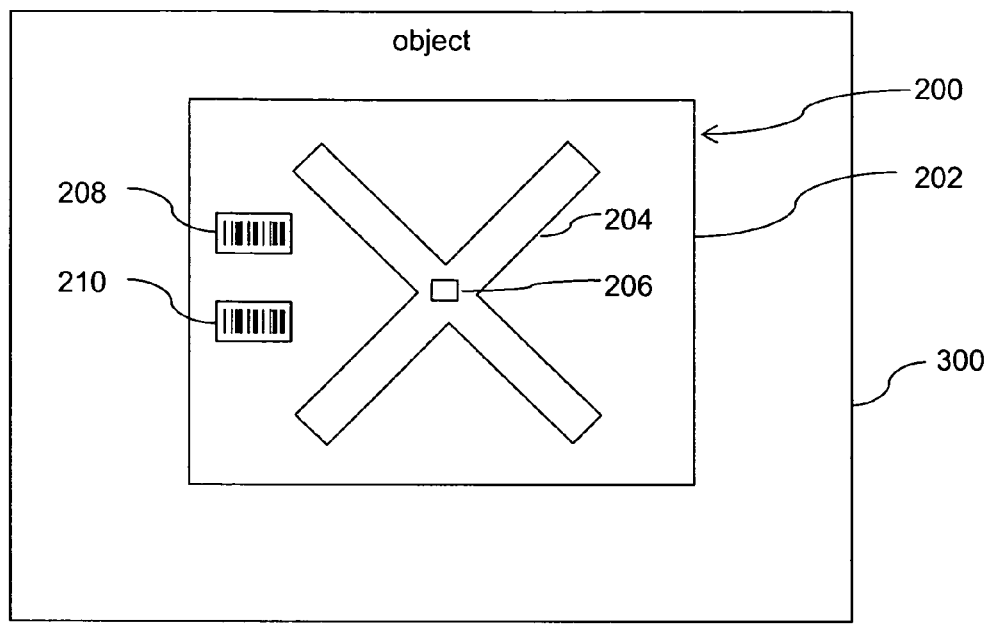
FIGS. 3A and 3B show tagged objects, according to example embodiments of the present invention.
Figure 3B:
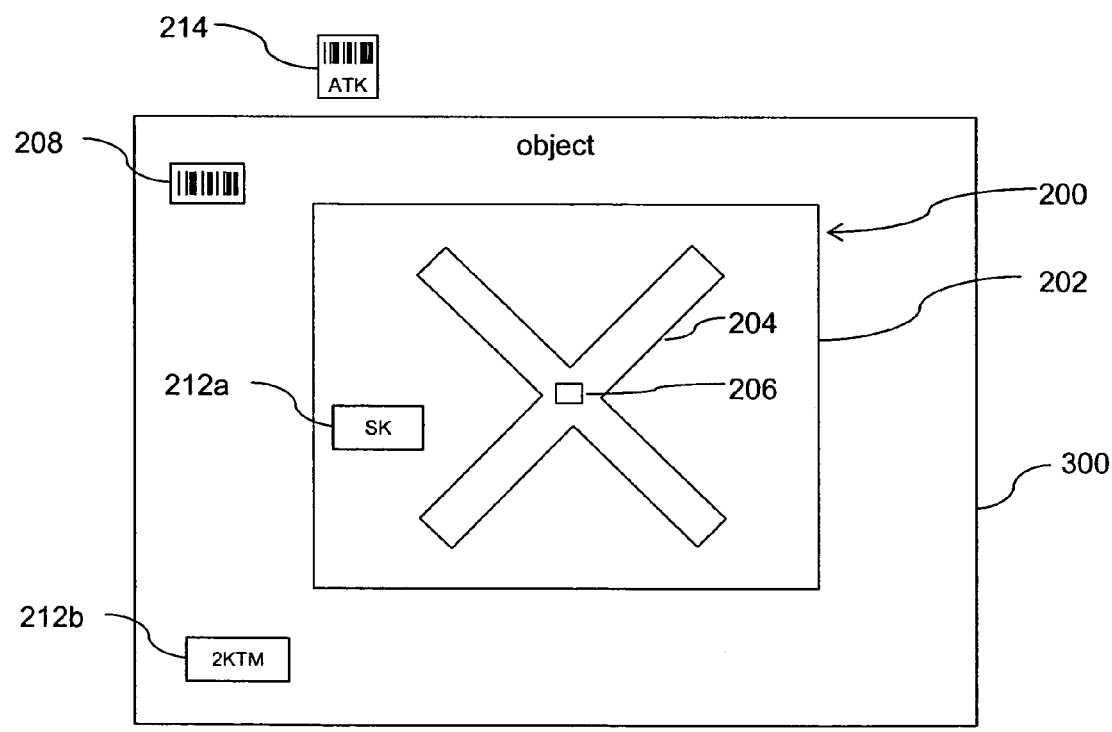

FIGS. 3A and 3B show examples of tags with a plurality of associated symbols, that are associated with objects, according to embodiments of the present invention. The plurality of symbols may be any combination of MRSs, HRSs, or CSs. The plurality of symbols may be physically located on the tag, physically located on the object, otherwise associated with the tag and object, or any combination thereof.

In the example embodiment of FIG. 3A, tag 200 is associated with an object 300. For example, tag 200 may be attached to object 300. A plurality of symbols 208 and 210 are associated with RFID tag 200. In FIG. 3A, symbols 208 and 210 are both printed or affixed to tag 200.

In the example embodiment of FIG. 3B, tag 200 is associated with object 300. A plurality of symbols, 208, 212a, 212b, and 214, are associated with RFID tag 200. In FIG. 3B, symbol 212a is printed or affixed to tag 200, symbols 208 and 212b are printed or affixed to object 300, and symbol 214 is otherwise associated with tag 200 and object 300.

In a further embodiment, at least one symbol of the plurality is pre-printed on the object or its container. In any of these embodiments, the plurality of symbols contains any combination of one more MRSs, HRSs, and CSs.

In embodiments illustrated by FIGS. 3A and 3B, information of tag 200 is segmented into a plurality of symbols. An embodiment of the invention may take advantage of the pre-printed symbol (e.g., ITF-14 barcode) as a first symbol on the object, and encode the remaining data of tag 200 in a second symbol. This second symbol may carry much less data than a single large symbol containing the relevant tag 200 data. Thus the second symbol may be printed at high speed and low cost compared to a single large symbol.

FIGS. 4A-4D show example embodiments containing at least one master data carrier (MDC). A MDC contains some information related to each or all of a set of objects. A MDC may be in any machine readable format capable of carrying data, such as 1-D or 2-D barcodes (e.g., PDF417 format, Data Matrix, MaxiCode, etc.), high density RFID tags, or any other machine readable format. MDCs can be attached or formed on any items in any manner, including conventional ways such as printing or silk screening directly onto the tag, object, pallet, or other item, printing the MDC on labels (e.g., stickers) that are applied to the tag, object, pallet, or other item, or any other way. One or more MDCs may be placed on a tag, object, pallet, or other item.

In a master data carrier embodiment, a tag is associated with a plurality of representations comprising at least one MDC and at least one of any combination of symbols (MRS, HRS, and CS). In the example embodiment illustrated by FIG. 4A, tag 200 is associated with object 300. A MDC 402 and a MRS 210 are shown. Data from representations MDC 402 and HRS 210 may be combined to form data related to tag 200.

A higher level of packaging (e.g., shipping container, case, or pallet) may contain multiple objects. In an example embodiment illustrated by FIG. 4B, a pallet 400 is shown, containing a plurality of objects 300a-n. Objects 300a-n may or may not be the same type of object, and may or may not be otherwise related. Objects 300a-n have associated RFID tags 200a-n. Each of tags 200a-n is associated with a symbol 210 and a symbol 212, which may contain different data as encoded for different tags 200a-n. In addition, each of tags 200a-n is associated with a MDC 402.

Figure 4A:
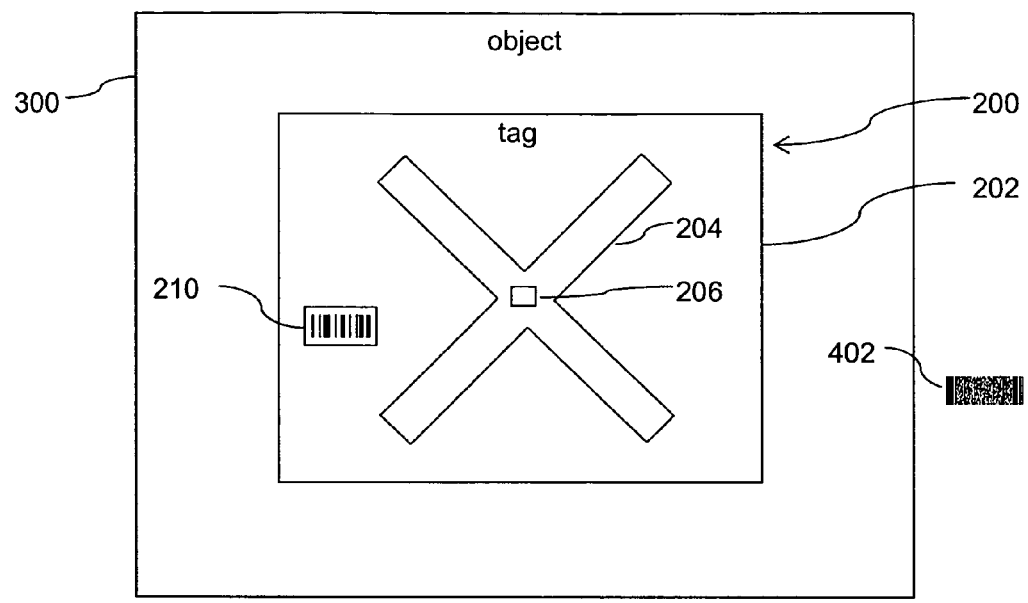
FIGS. 4A-4D show tagged objects, according to example embodiments of the present invention.
Figure 4B:
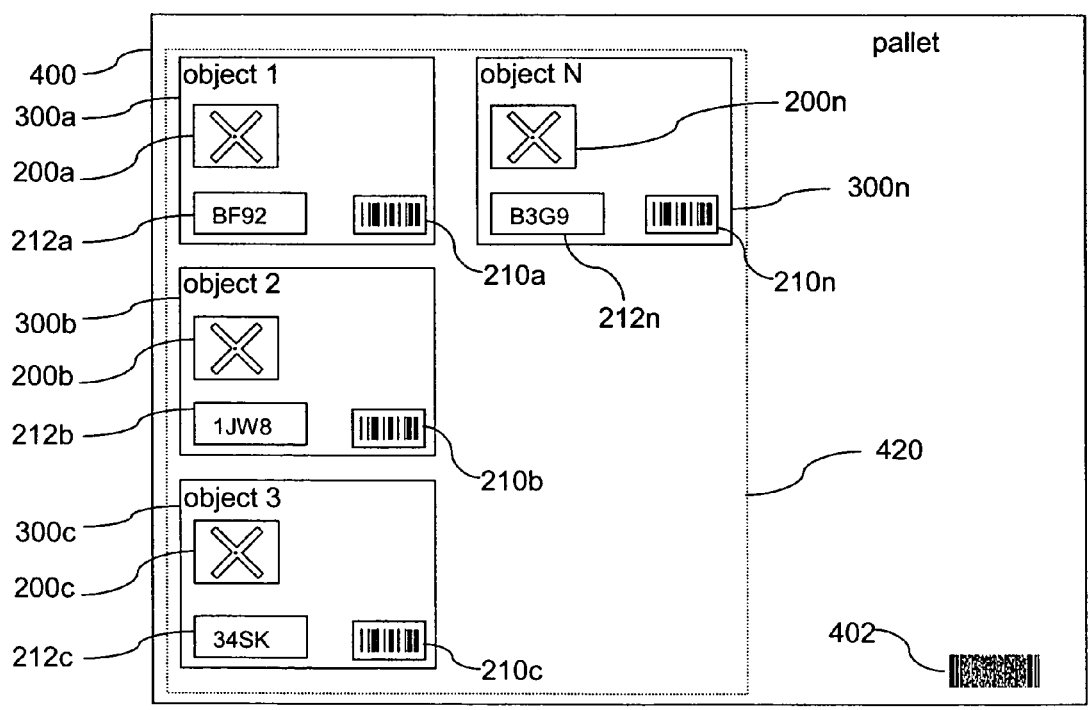

In embodiments, subsets of objects 300 of pallet 400 may be associated with each other. For example, FIG. 4B shows a subset 420 of objects 300a-n that are associated with each other. Other objects (not shown) may be on pallet 400.

Figure 4C:
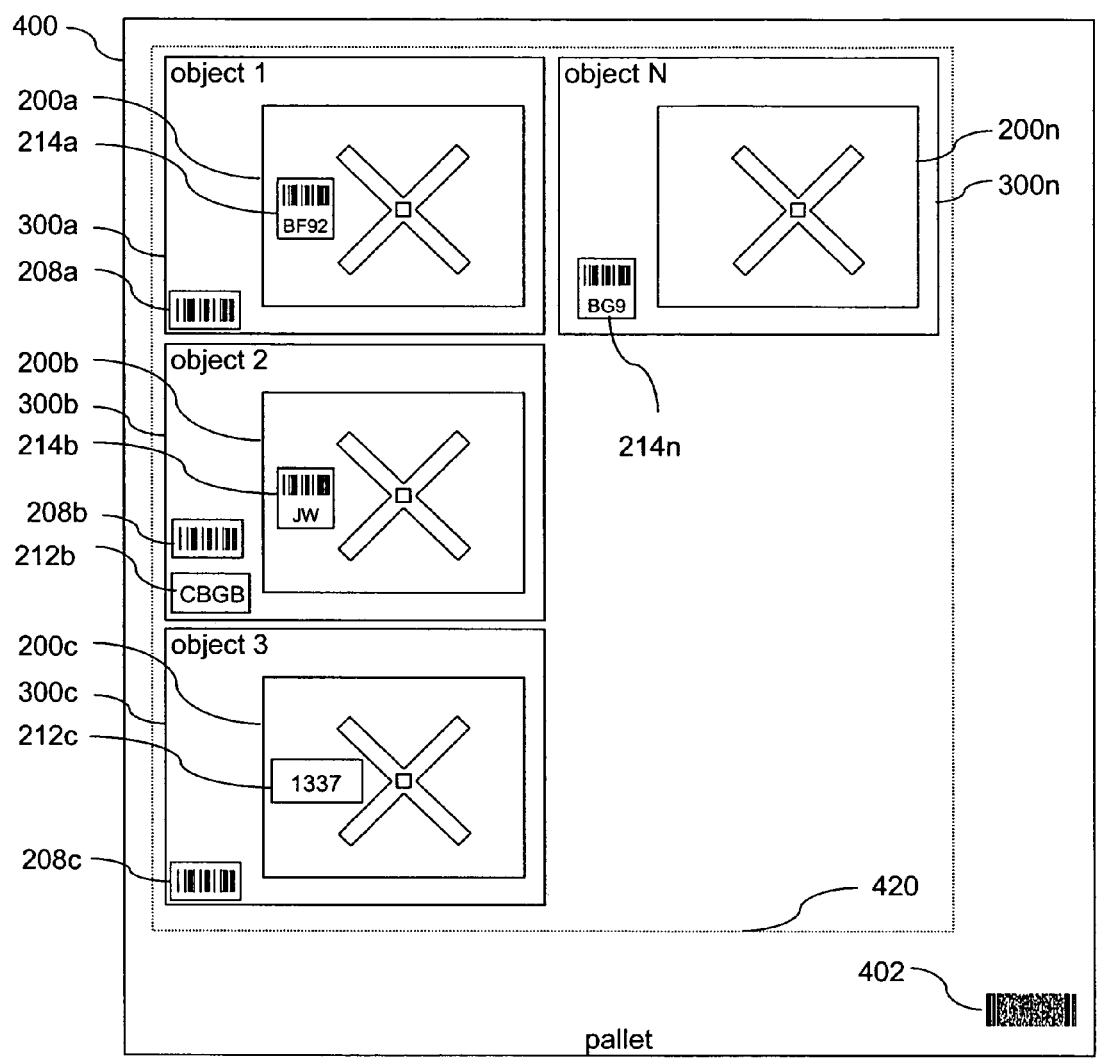

FIG. 4C illustrates an example embodiment similar to that of FIG. 4B, except that each of tags 200a-n is associated with a different combination of symbols and/or symbol positions. Thus, in embodiments, each object in a series of associated objects need not have the same types, numbers, or locations of symbols. Each of tags 200a-n in an example shown in FIG. 4C is associated with one or more MRSs, HRSs, and CSs, in addition to being associated with the single MDC 402.

Figure 4D:
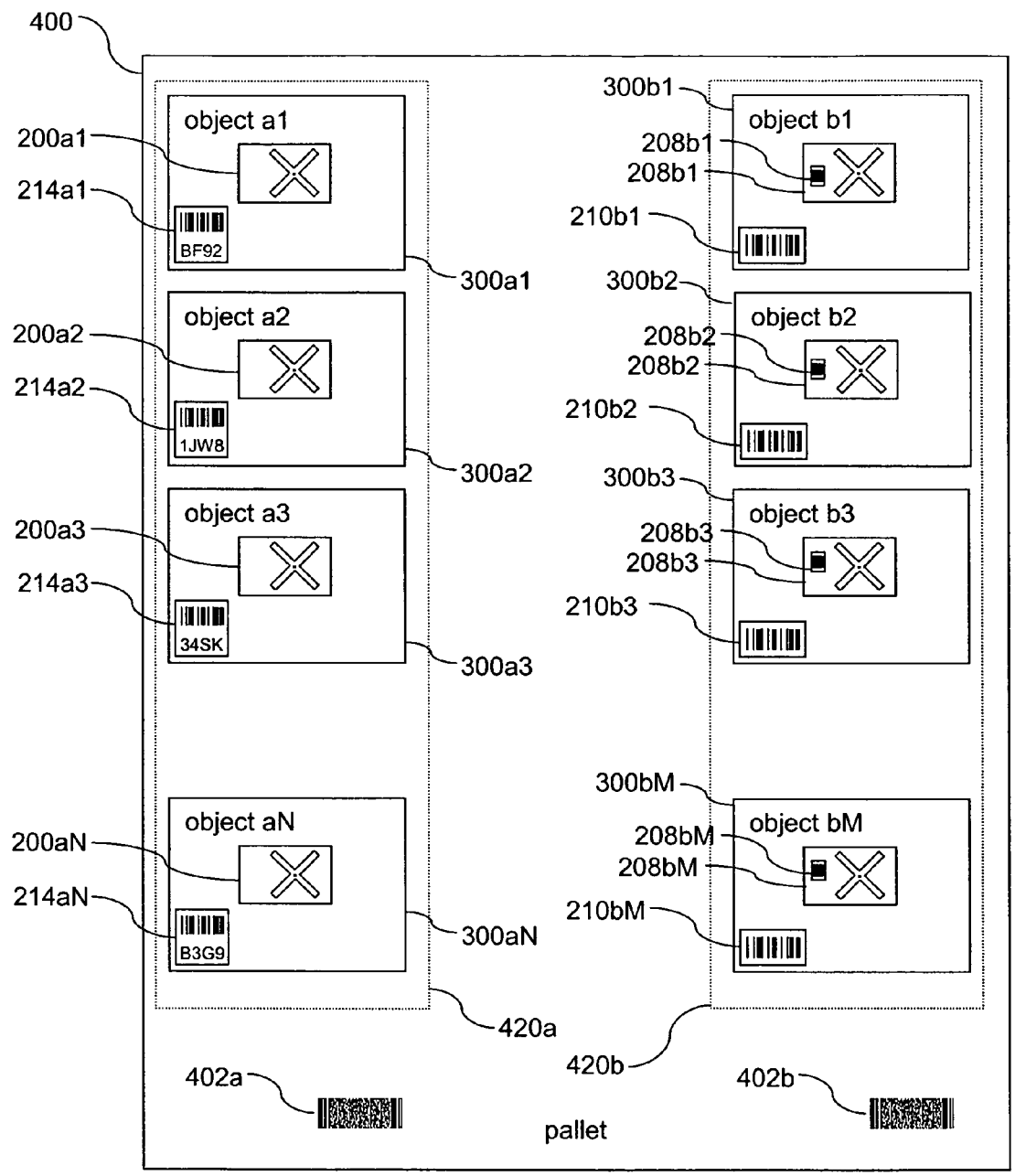

FIG. 4D illustrates an example embodiment showing a first and a second subset (420a and 420b, respectively) of associated objects 300 are present on a pallet 400. Each subset may contain the same or a different number of objects. Other objects (not shown) may be on pallet 400. In this example, subset 420a includes objects a1 through aN, and subset 420b includes objects b1 through bM. A MDC may be associated with both subsets 420a and 420b, or a separate MDC or MDCs may be associated with each subset. In an embodiment, a MDC 402a is associated with subset 420a, and a MDC 402b is associated with the subset 420b. Thus, data encoded into symbols associated with objects a1-aN may be combined with MDC 402a data to reconstitute data related to their respective tags 200a1-200aN, and similarly, the data on the symbols associated with objects b1-bM may be combined with MDC 402b data to reconstitute data related to their respective tags 200b1-200bM.

Embodiments using one or more MDCs may efficiently and compactly encode fixed portions of the unique identification of multiple objects (including all objects in some embodiments) on a pallet or other container in one or more MDCs. Variable data may be encoded in the symbol(s) associated with the objects. For example, a case of items from a manufacturer typically contain a number of identical retail items, which may be serialized (i.e., assigned serial numbers) to distinguish one instance of a product from another. A pallet may contain a fixed number of cases of the same product. A mixed pallet contains cases of different retail items, typically all from one manufacturer. A RFID tag is associated with each case. The tags may contain a unique identification including the serial numbers that distinguishes different cases of the same product. A single symbol replicating the RFID tag information of a case tag may be prohibitively long (e.g., 96 bits or about 30 digits in one existing commercial standard) and correspondingly slow and expensive to print in either 1-D or 2-D barcode formats.

In an example illustrated by FIG. 4B, objects 300 may each represent an instance of a serialized item within a case, or alternately, objects 300 may each represent a case on a pallet. In an embodiment, each symbol 210 is the pre-printed ITF-14 barcode for a respective case. The ITF-14 symbol identifies the retail items in the case by the Stock Keeping Unit (SKU), but not down to the serial number of each case. A portion of the serial number data may be stored in MDC 402. The remaining variable data burden (comprising the remaining unique identifying information) is contained in a HRS symbol 212 (but which may, in other embodiments, be an MRS or CS). Thus the onerous printing, reading, and scanning of a large symbol on each case is replaced by one large MDC for a series of cases and the rapid and inexpensive printing, reading, and scanning of a relatively short symbol or symbols on each case. In addition, an operator will be able to rapidly and remotely identify a case by its short human readable symbol (or human readable component of a CS), speeding case identification, when human readable characters are used for symbols. As noted earlier, objects 300 may alternatively represent items within a single case, and in this alternative embodiment, an MDC on the case can yield the same advantages as were just described for an MDC on the pallet.

Example Data Encoding Operational Embodiments

Figure 5A:
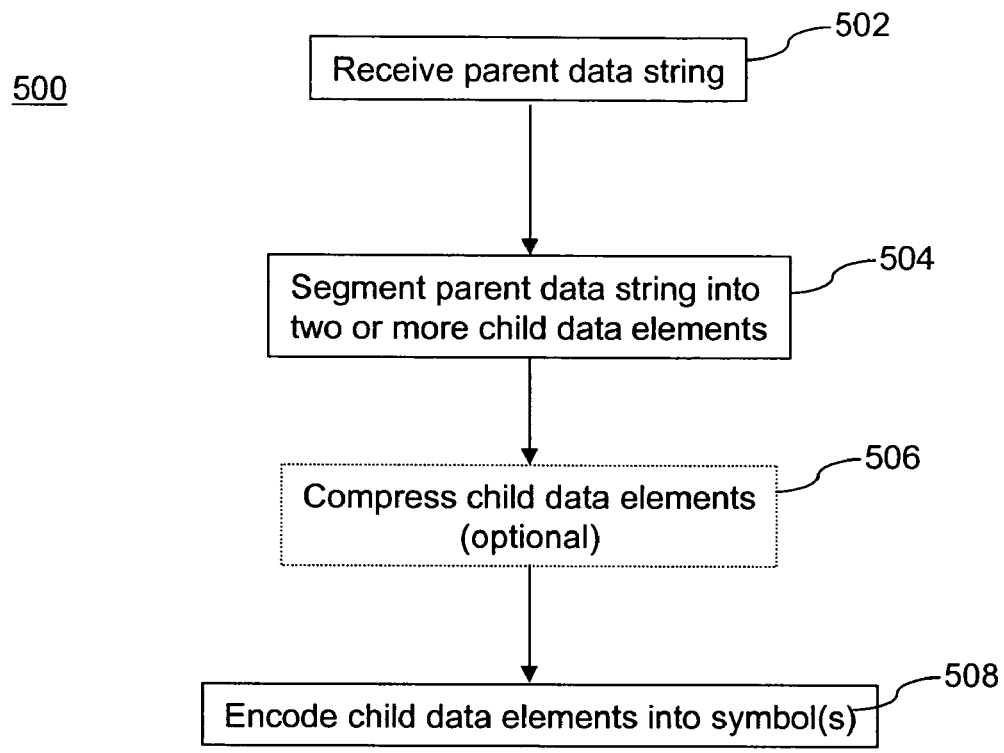
FIG. 5A shows a flowchart providing an example embodiment of the present invention for obtaining symbols from a data string.

FIG. 5A shows a flowchart 500 providing example steps for encoding data associated with an RFID tag, according to example embodiments of the present invention. Other structural and operational embodiments will be apparent to persons skilled in the relevant art(s) based on the following discussion related to flowchart 500. The steps shown in FIG. 5A do not necessarily have to occur in the order shown. The steps of FIG. 5A are described in detail below.

Figure 5B:
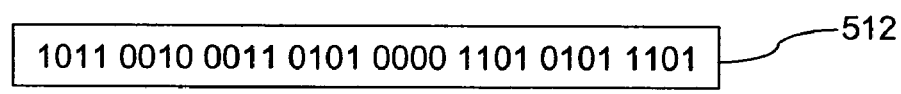
FIGS. 5B and 5C show the segmentation of a data string, according to example embodiments of the invention.

Flowchart 500 begins in step 502. In step 502, a data string associated with an RFID tag is received. The received data string is referred to as a "parent" data string simply to distinguish it from its "child" data elements. For example, FIG. 5B shows a parent data string 512. In this example, parent data string 512 has 32 bits. However, a data string may be of any fixed or variable number of bits and can alternatively be alphanumeric or other data type.

Figure 5C:
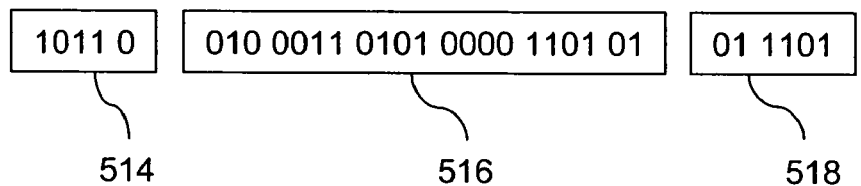

In step 504, a received parent data string is segmented into a plurality of data elements, referred to as child data elements. For example, FIG. 5C shows segmented child data elements 514, 516, and 518 of five, twenty-one, and six bits respectively. However, child data elements may be of any length and any number two or greater of child data elements may be segmented from the parent data string. The child data elements need not completely encompass the parent data string. The segmented data elements need not correspond directly, bit-for-bit, with the portions of the parent data string from which they were derived. One or more segmented data elements may result from a rearrangement of data from the parent string, and may result from referring to a lookup table or tables using data from the parent data string. The data elements may even duplicate portions of the parent data string.

In optional step 506, one or more child data elements may be compressed by any well known compression algorithm, such as Lempel Ziv Welch, Huffman Coding, Arithmetic Coding, or by any other means, including but not limited to those methods which are specially designed to take advantage of any characteristics of the actual data in any particular embodiment. One such specially designed data compression method is described elsewhere herein. By compressing a data element, a size of the data element is reduced. There is no requirement that the compression algorithm is lossless, as some information may not be necessary and therefore may be discarded.

In step 508, the child data elements are encoded into symbols. For example, data element 514 is encoded into a first symbol, data element 516 is encoded into a second symbol, and data element 518 is encoded into a third symbol. The plurality of symbols resulting from step 508 may include any combination of MRSs, HRSs, and CSs. For example, in an embodiment, a parent data string received in step 502 may result in two MRSs in step 508. In another embodiment, a parent data string received in step 502 may result in one CS and one HRS and one MRS in step 508. In yet another embodiment, a parent data string received in step 502 may result in a MRS of the pre-printed UPC symbol on an item and an additional CS of data supplementing the UPC.

Flowchart 500 illustrates a process applicable to embodiments of the invention. For example, in an embodiment, individual objects are tracked after they have been unpacked from a higher level of packaging (e.g., shipping container, case, or pallet). Multiple symbols on each object are sufficient to reconstitute the RFID information for each object. The objects may be pre-labeled by the manufacturer with a symbol (e.g., an ITF-14 barcode) in an embodiment; in another embodiment, the objects may be labeled with a symbol by another party. In yet another embodiment, the objects are pre-labeled by the manufacturer and a supplementary symbol is placed on the object by another party. Flowchart 500 is applicable to these and other related operational embodiments.

Figure 6A:
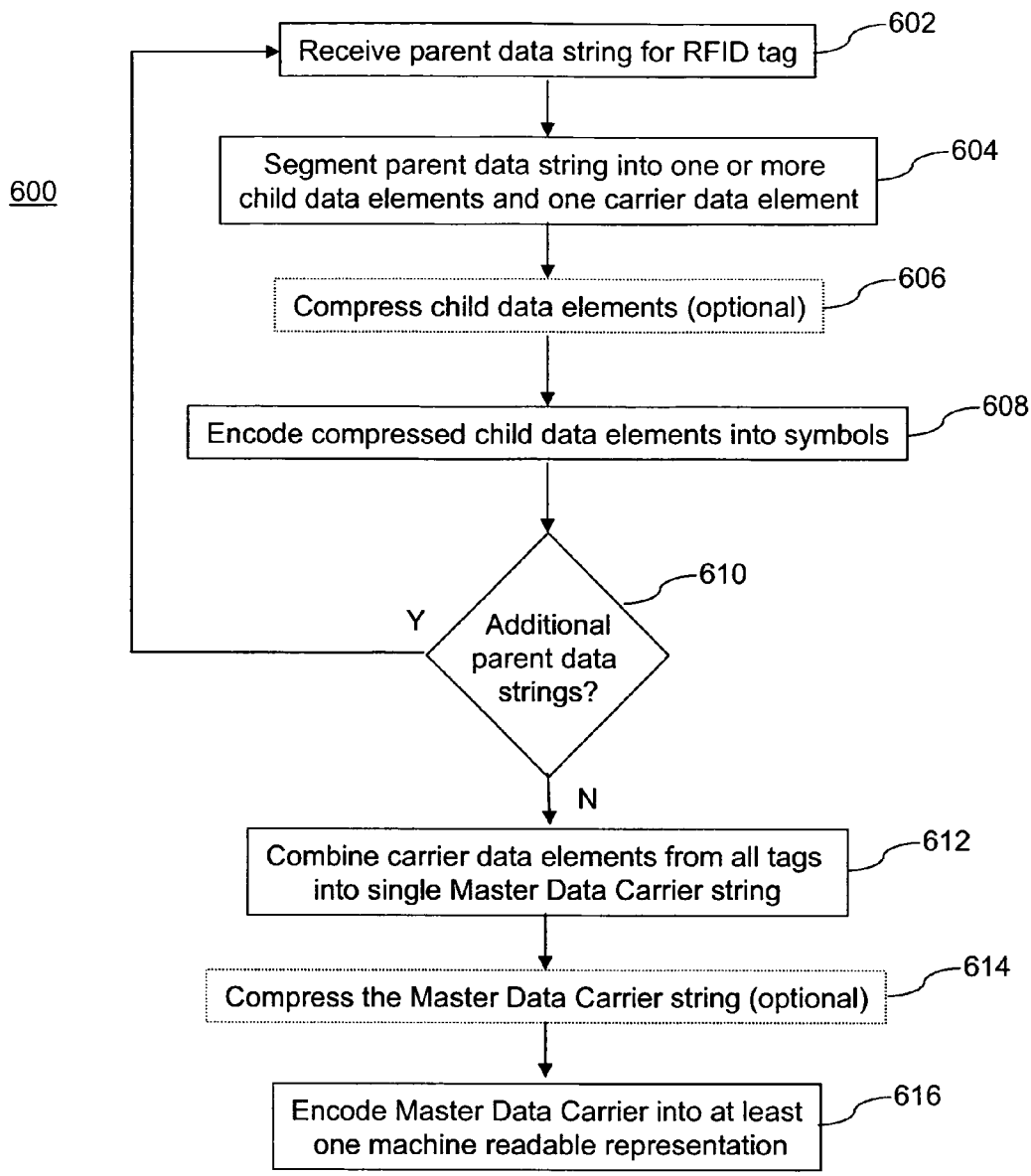
FIG. 6A shows a flowchart providing an example embodiment of the present invention for obtaining at least one symbol and at least one Master Data Carrier symbol from the data associated with at least one RFID tag.

FIG. 6A shows a flowchart 600 providing example steps for encoding data associated with at least one RFID tag into representations comprising of symbols and at least one MDC, according to example embodiments of the present invention. Other structural and operational embodiments will be apparent to persons skilled in the relevant art(s) based on the following discussion related to flowchart 600. The steps shown in FIG. 6A do not necessarily have to occur in the order shown. The steps of FIG. 6A are described in detail below.

Figure 6B:
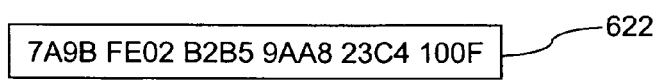
FIGS. 6B and 6C show the segmentation of at least one data string and the designation of carrier data, according to example embodiments of the invention.

Flowchart 600 begins in step 602. In step 602, a parent data string associated with the first tag is received. FIG. 6B illustrates an example parent data string 622 which has twenty-four hexadecimal characters (or 96 bits). However, a parent data string may be of any fixed or variable number of bits and can alternatively be binary, alphanumeric, or other data type.

Figure 6C:
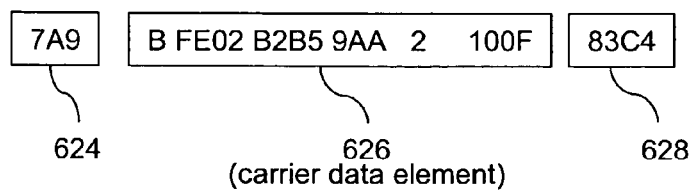

In step 604, the parent data string is segmented into at least one child data element and a carrier data element. For example, FIG. 6B shows child data elements 624 and 628 and carrier data element 626. In the sample embodiment illustrated in flowchart 600, carrier data element 626 is destined for encoding into the MDC, and stored for that use in a later step. FIG. 6C illustrates example child data elements 624 and 628 which are three and four hexadecimal (12 and 16 bit) strings and a carrier data element 626 which is a 17 hexadecimal (68 bit) string. However, all data elements may be of any length. Any number of one or more child data elements and at least one carrier data element may be segmented from the data string. These data elements need not completely encompass the parent data string. The data elements need not correspond directly, bit-for-bit, with the portions of the parent data string from which they were derived. One or more data elements may result from a rearrangement of data from the parent string, and may result from a lookup based on data from the parent string. The data elements may even duplicate portions of the parent data string with respect to the other data elements.

In optional step 606, child data elements may be compressed by any well known compression algorithm, such as Lempel Ziv Welch, Huffman Coding, Arithmetic Coding, or by any other means including but not limited to those methods which take advantage of any characteristics of the actual data in any particular embodiment. One such data compression method is described elsewhere herein. There is no requirement that the compression algorithm is lossless, as some information may be not be necessary and therefore may be discarded. The carrier data element 626 may also be compressed. In another embodiment, it is not compressed in step 606.

In step 608, child data elements are encoded into symbols. For example, child data element 624 may be encoded into a first symbol and data child element 628 may be encoded into a second symbol. The symbols resulting from step 608 may include any combination of one or more MRSs, HRSs, and CSs. For example, in an embodiment, a parent data string received in step 602 may result in two MRSs in step 608. In another embodiment, a parent data string received in step 602 may result in one CS and one HRS and one MRS in step 608. In yet another embodiment, a data string received in step 602 may result in a MRS of the pre-printed ITF-14 symbol on an object and an additional CS of data supplementing the ITF-14 symbol.

In decision step 610, if there are any more parent data strings in the series, go to step 602 and repeat the previous steps for the next parent data string. If there are no more parent data strings, proceed to step 612.

In step 612, the carrier data elements from each parent data string are combined into a single MDC string.

In optional step 614, the MDC string may be compressed by any well known compression algorithm, such as Lempel Ziv Welch, Huffman Coding, Arithmetic Coding, or by any other means including but not limited to those methods that take advantage of any characteristics of the actual data in any particular embodiment. One such example data compression methods is described elsewhere herein. There is no requirement that the compression algorithm is lossless, as some information may be not be necessary and therefore may be discarded. Redundant information may be discarded in this step and/or an earlier step, such as when carrier data elements were first designated.

In step 616, the MDC string is encoded into at least one representation. A MDC resulting from step 616 may include any combination of one or more MRSs, HRSs, CSs, or any other sufficient density storage medium.

Flowchart 600 illustrates a process applicable to other embodiments of the present invention. For example, in an embodiment, RFID tags associated with individual objects from a higher level of packaging may not need to be reconstituted after entering a facility (e.g., if there are very low RFID tag failure rates after the objects are received at the facility, or for any other consideration). In this case, the data segmented into the carrier data element from the parent data string for each object (in step 604) contains common information for the other objects in a higher level of packaging (e.g., pallet). The child data elements need not repeat nor reference this common information, although in some applications they may. These carrier data elements are eventually encoded into a MDC associated with the higher level of packaging (e.g., pallet).

In other embodiments, a receiving activity may desire to track individual objects after they have been unpacked from a higher level of packaging (e.g., pallet), but the representations (the symbols and any MDCs) do not contain all of the data needed to reconstitute all of the RFID information for an object. Instead, the shipper may send the receiving activity a shipment's detailed contents separately, either electronically (e.g., in an Advanced Ship Notice transmitted through Electronic Data Interchange or similar interaction) or some other medium (e.g., CD-ROM, hardcopy shipping inventory). The receiving activity may then store the detailed contents in an inventory control system. The detailed contents may be retrievable using a shipment identifier (e.g. SSCC) as a database key. Therefore, once a shipment's detailed contents are in the receiving activity's inventory control system, a very small amount of information is needed to uniquely identify a particular object from a specific shipment.

FIG. 9A shows a flowchart 900a providing example steps for an embodiment where the objects in a shipment are associated with one or more symbols (e.g., MRS, HRS, or CS), and the detailed contents are sent separately, according to example embodiments of the present invention. Other structural and operational embodiments will be apparent to persons skilled in the relevant art(s) based on the following discussion related to flowchart 900a. The steps shown in FIG. 9A do not necessarily have to occur in the order shown. The steps of FIG. 9A are described in detail below.

Flowchart 900a starts with step 910, where the complete object data is split into identifier and detailed contents. In step 504a, the identifier is segmented into one or more child data elements. In optional step 506a, the one or more child data elements may be compressed, and in step 508a, the one or more child data elements are encoded into symbols. Steps 504a-506a are similar to steps 504-508 in flowchart 500, shown in FIG. 5A and described in detail elsewhere herein. The one or more symbols from step 508a are associated with the object in step 914. In step 916, the shipment's detailed information is sent to the receiving activity.

FIG. 9B illustrates another example embodiment where the objects in a shipment are associated with one or more symbols and one or more MDCs, and the detailed contents are sent separately. Flowchart 900b starts with step 920, where each object's complete object data is split into identifiers and detailed contents. In step 922, the identifiers are sent to a process illustrated by flowchart 600, shown in FIG. 6A and described in detail elsewhere herein. The identifiers are received in step 602 of flowchart 600 as parent data strings. The one or symbols from step 608 and the one or more MDCs (in machine readable format) from step 616 are associated with the object and shipment in step 924 of flowchart 900b. In step 926, the shipment's detailed contents are sent to the receiving activity.

Detailed contents may include a direct bitwise representation of the data in each RFID tag or an alternate form of the identifier encoded in each tag (e.g., using the two EAN.UCC standard data elements known as AI 01 and AI 21). Once the detailed contents are in the inventory control system of a receiving activity, they are retrievable using the shipment identifier (e.g., SSCC) as a database key.

A very small amount of information (e.g., the last few digits of a serial number) is needed to uniquely identify one object in a specific shipment since the detailed contents are stored elsewhere. To enhance the uniqueness of the symbols on each object, in an embodiment the symbols may be generated just after the objects are collected and assembled for shipping. Thus, part or all of a shipment identifier (e.g., a Serialized Shipping Container Code, or SSCC) may be encoded into the representations (e.g., one or more optical symbols) associated with each object. To illustrate using the examples above, the identifiers in steps 910 and 920 contain this information (e.g., last few digits of serial number and SSCC), which is eventually encoded into one or more symbols in steps 914 and 924 (of flowcharts 900a and 900b respectively).

In a further embodiment, in addition to sending a shipment's detailed contents separately, some portion or all of the detailed contents are encoded in one or more MDCs associated with the shipment. FIG. 9C illustrates an example where the objects in a shipment are associated with one or more symbols (e.g., MRS, HRS, or CS), and one or more MDCs. Some or all of the detailed contents are encoded into the one or more MDCs. Flowchart 900c starts with step 930, where each object's complete data is split into identifiers and detailed contents. In step 932, the identifiers and some or all of the detailed contents are sent to a process illustrated by flowchart 600, shown in FIG. 6A and described in detail elsewhere herein. The identifiers and some or all of the detailed contents are received in step 602 of flowchart 600 as parent data strings. The one or symbols from step 608 and the one or more MDCs (in machine readable format) from step 616 are associated with the object and shipment in step 934 of flowchart 900b. In step 936, the shipment's detailed contents are sent to the receiving activity. In another embodiment, the entire detailed contents are encoded into the one or more MDCs and is not sent separately (thus omitting step 936).

In these and other embodiments, a short, unique or quasi-unique identifying value may be encoded and associated with each object. In addition to the aforementioned last few digits of the serial number, with or without the addition of the SSCC, other embodiments may use more sophisticated means of determining suitable unique or quasi-unique values.

For example, in an embodiment, a Cyclic Redundancy Check (CRC) of the object's tag identifier is used. CRC is generally used for error detection. There are different implementations of CRC classified by size, for example, CRC-16 generates 16 bit remainders. Since a 16 bit remainder generated by CRC-16 has some degree of uniqueness, embodiments may use them to identify or help identify a product. Additionally, CRC-16 is also commonly used in existing standards such as the EPC Generation 2 tag structure. It is noted that CRC, CRC-16, or other error correction terms are recited herein for illustrative purposes. Any specific error detection algorithm (checksum, CRC-x, etc.), or any hashing function may be used in embodiments. Since current industry standards use CRC-16 or similar variations, some example embodiments are most naturally described using this language.

In embodiments described elsewhere herein and illustrated by flowchart 900c (FIG. 9C), the shipment's detailed contents are sent separately (electronically or in a physical medium). In some example embodiments, a portion of the detailed contents are encoded into the one or more MDCs; for example, the MDC may contain the list of complete SKUs in the shipment, the list of SKUs with incomplete serialization, or the list of SKU's and a CRC of every item's tag identifier. In these and other embodiments, SKUs and CRCs are used merely as examples to illustrate underlying concepts, these embodiments are in no way limited to any standard or set of standards for identification.

In embodiments, the individual objects (items or cases) on the pallet may be labeled with only the minimum symbol information (in the form of HRS, MRS, or CS, or any combination thereof) needed to guarantee uniqueness within that particular shipment. It may be preferable to print and apply the case labels after a set of cases has been selected for shipment and is about to be palletized. In other embodiments, a complete human readable serial number may be printed, but the operator encountering a failed tag need only enter the last few digits in order to uniquely identify an item from the shipment.

Example Special Data Compression Embodiment

As illustrated in step 614 of flowchart 600 shown in FIG. 6A, in an embodiment, a MDC string may be compressed. In a further embodiment, a compression method may be designed to take advantage of characteristics of the actual or anticipated data and its application in particular embodiment. A compression method designed to take advantage of the characteristics of the data can yield more effective compression than a general-purpose compression method.

Since a packing list is flat and can be sorted before compression, a compression method may make extensive use of references to previous data items on the list; in contrast, the LZW-type compression methods define and re-use common substrings. In addition, a compression method may give an all-numeric result. An all-numeric message may be more efficiently represented in PDF417 and most other 1D and 2D barcode symbologies. This section describes example embodiments of a compression method demonstrating these characteristics. Although one simulated data standard is used as an illustrative example, one skilled in the arts may make minor modifications to this method to adapt it to all known and foreseeable identification number systems.

FIGS. 11A and 11B illustrate the compression of a list of RFID tag data into a Master Data Carrier (MDC) data string. FIG. 11C further illustrates the compression of sample list of simulated RFID tag data. FIGS. 13A-13C show Tables 1310-1330, which describe a simulated RFID tag data standard which will be used to demonstrate an embodiment of the invention. This simulated standard closely resembles existing tag data standards in many respects and is suitable to demonstrate embodiments of the invention.

FIG. 13A illustrates the simulated RFID tag data standard. The first 16 bits contains the CRC-16 which is calculated and stored by the tag itself on startup. A similar check bit string is contained in actual RFID tag data standards for the same reason.

The next 16 bits are the Protocol Control (PC) bits. The PC bits are used by the tag data standard to denote the number of valid words following the PC bits. Other uses are possible depending on the tag data standard. The PC bits will be the same combination of bits for all tags using the same data standard. Since most pallets or other containers will contain somewhat related items, the PC bits should be the same for all of the items on a pallet in most cases. A similar 16 bit PC bits field is contained in actual RFID tag data standards for the same reasons.

The next eight bits (which would require 3 decimal digits) contains the header. The header informs the reading system what tag data standard is being used. The header will be the same combination of bits for all tags using the same data standard. Since most pallets or other containers will contain somewhat related items, the header should be the same for all of the items on a pallet in most cases. A similar eight bit header is contained in actual RFID tag data standards for the same reasons.

The next three bits contains the filter value. The filter value is user-defined in accordance with Table 1320 in FIG. 13B. In many instances, an actual pallet may contain items of the same filter value. However, some pallets may contain items with different filter values. A similar three bit header is contained in actual RFID tag data standards for the same reasons.

The next thee bits contains the partition value. The partition value determines the division of the fixed length Stock Keeping Unit (SKU) into the variable length Company Prefix and Item Reference. FIG. 13C shows Table 1330 illustrating the possible SKU divisions into Company Prefix and Item Reference. A similar three bit partition is contained in actual RFID tag data standards for the same reasons.

The next 44 bits contain the SKU. The fixed length SKU is divided into Company Prefix and Item Reference. The division of the SKU into variable length Company Prefix and Item Reference depends on the preceding partition value and the corresponding row in Table 1330. A one digit indicator digit is included in the Company Prefix. This SKU format is commonly used today. A similar 44 bit SKU is contained in actual RFID tag data standards (e.g., the European Article Numbering/Uniform Code Councile (EAN.UCC) data element AI 01, also known as a Global Trade Item Number (GTIN)).

The next 38 bits contains the item's Serial Number (S/N). Although different data standards allow for different S/N lengths, 38 bit or 12 decimal digit S/Ns are commonly used today. A similar 38 bit S/N is contained in actual RFID tag data standards (e.g., the EAN.UCC data element AI 21).

FIG. 14A shows table 1410 which illustrates an example of twelve case identifications (Case ID) represented in the simulated tag data standard described elsewhere herein. Any number of Case IDs may be used. Although this example uses cases, this process applies to any tagged object identifications. Each Case ID is on a separate row of the table, preceded by a case number. The case number is not part of the data, but is included for clarity. Next are the PC bits (in hexadecimal), Header bits (in hexadecimal), Filter value (in octal) and Partition value (in octal). Each case ID is shown as a pair of items: a SKU, which identifies the type of item, and a S/N, which uniquely identifies different instances of the same SKU. Spaces have been added to the SKU values to show the Indicator Digit, Company Prefix and Item Reference portions of the SKU, but the actual data would typically contain no spaces. Additionally, each SKU is shown as ending with a 'c' character, which logically represents the Modulo 10 Check Digit of each SKU (not shown in FIGS. 13A-13C). These will typically be dropped when compressing. Also, leading zeroes are not shown for the fixed 12 digit field allocated for Serial Numbers (S/N). From this information, the RFID tag data on each case can be constructed or reconstructed. The CRC-16 on the tag is calculated and therefore is not shown.

This example list corresponds to the contents of a mixed pallet of twelve cases, where three cases were from a particular SKU (such as twelve 16-ounce boxes of a certain brand of corn flakes), eight cases were a different SKU from the same manufacturer, and one case was an SKU from a different manufacturer, as indicated by differences in their SKU values.

FIGS. 11A and 11B show a flowchart 1100 providing example steps for an embodiment of the invention where a list of object identifications is compressed, according to example embodiments of the present invention. In addition, FIG. 11C shows a flowchart 1150, when read with flowchart 1100 provides a specific example of an embodiment of the invention applied to a specific data structure.

In example embodiments using the simulated data illustrated in FIGS. 14A-14F (tables 1410-1460), the last four digits of each S/N are truncated. Any number of digits may be truncated in other embodiments of the invention. These truncated digits will be encoded into the MRS, HRS, or CS associated with the individual case. They will serve as the unique or quasi-unique identifiers used for rapid identification and reconstitution after a failed tag read. An important feature of this example compression embodiment is that the repetitive information is encoded into the MDC and the very short identifier data is encoded on the object's symbol.

Other structural and operational embodiments will be apparent to persons skilled in the relevant art(s) based on the following discussion related to flowcharts 1100 and 1150. The steps shown in FIGS. 11A-11C do not necessarily have to occur in the order shown. The steps of FIGS. 11A-11C are described in detail below. Steps 1106-1118 generate the MDC header of a MDC string, while steps 1120-1132 append data after the header to complete the MDC string. Steps 1152-1164 (on flowchart 1150) expand step 1126 to illustrate an example embodiment of a compression method applied to the specific data illustrated in table 1410.

Flowchart 1100 starts with step 1102, in which a list of object identifications (in the example, Case IDs) is received. The format will typically be known, and in the simulated data illustrated in table 1410, the Case IDs are in the simulated format.

In step 1104, the list is sorted in ascending order, first by SKU, then by S/N. Note that in other embodiments, the list may be sorted in other ways and/or order.

In step 1106, a default number of leading zeroes in the S/N is determined. This may be accomplished by several methods, for example, the most prevalent number of leading zeroes may be made the default. In another embodiment, the MDC may be repeatedly compressed with different default values of leading zeroes and the value resulting in the best compression is used. In other embodiments, the average number of leading zeroes may be made the default. In another embodiment, the default number of leading zeroes may be predetermined. This step does not limit the possible methods of determining the default number of leading zeroes.

In step 1108, a default number of truncated trailing digits in the S/N is determined. Similar to step 1106, this step places no limit on the methods to be used to determine the default number of truncated trailing bits. In an embodiment, it is predetermined by the user depending on his needs. In another embodiment, standard and non-standard statistical methods are used to determine the default number of trailing digits to truncate. Digits may be truncated in order to provide more efficient identification of individual objects for example.

In step 1110, a default PC Bits field is determined. As with the prior steps, this step is not meant to limit the process of determining the default PC Bits field. Similarly, in step 1112, a default Header field is determined. Referring to FIG. 11A, note all twelve case IDs start with the same PC bits and Header. Although this would not always be the case, in many practical case identification schemes it would be typical. In this example, the Header indicates the data structure used for the tag ID. All of the items on a particular pallet or container would most likely use the same case ID data structure. Since the choice of data structure dictates the length of the data for a Case ID data structure, the PC bits are all the same as well. In an embodiment, the most common values of PC bits and Header are chosen as the default. In other embodiments, other ways of choosing default values may be used.

In steps 1114 and 1116 the default filter and partition values are determined. As with prior steps, these values may be determined through any standard or non-standard statistical methods. In an embodiment, the most common values are chosen as the defaults. In other embodiments, other ways of choosing a default value may be used. This step does not limit the processes which could be applied in these steps.

Thus, MDC format can include a header section that defines default values (for PC bits, Header, Filter, and Partition values) for a particular pallet or container that would be common to most or all of the Case IDs associated with that pallet or container. In step 1118, a MDC header is generated from the values determined in prior steps. FIG. 14E shows table 1450, illustrating a MDC header generated by an example embodiment using the simulated data, showing the defaults that result from an analysis of the sorted list, and a decision to truncate the last four digits of each serial number. The MDC header forms the first part of a MDC string. The following steps append further data to the MDC header, to further form the MDC string.

FIG. 14B shows table 1420 illustrating the locations of the various fields in an example MDC. As shown in table 1410, sorting the list of Case IDs by SKU then by S/N may reveal commonalities between Case IDs even on a mixed pallet.

Objects on a mixed pallet tend to be from just a few manufacturers, and the objects from each manufacturer tend to have been made at the same plant at about the same time; therefore the S/Ns tend to show many commonalities in addition to the large number of leading zeroes commonplace in the simulated data standard's fixed-length field.

In step 1122 shown in FIG. 12B, the first object identification from the list is received. For example, an object identification for an RFID tag may be received from the list. In step 1122, calculable fields (e.g., the previously mentioned CRC-16 and checksum, etc.) are dropped (i.e., removed from data string). Being calculable, these fields may be recalculated later if desired. In an embodiment, all calculable fields are dropped. However, it may be desired to retain one or more calculable fields; in another embodiment, only some calculable fields are dropped. In yet another embodiment, no calculable fields are dropped.

In step 1124, the trailing digits are truncated. The number of trailing digits to be truncated may be determined by any method. For example, the number of trailing digits to be truncated may be predetermined. The number of digits truncated can vary for each tag. The truncated digits are encoded into at least one symbol (MRS, HRS, or CS) as described elsewhere herein.

In step 1126, the compressed Item Entry is constructed. FIG. 11C shows flowchart 1150, described elsewhere herein, which illustrates an example embodiment. In other embodiments, other techniques may be used to construct the compressed Item Entry. In embodiments of the invention, the current compressed Item Entry is constructed based on the value of the previous uncompressed Item Entry.

In decision step 1128, if there are more tag strings in the uncompressed tag list, then proceed to step 1130. If there are no more tag strings in the uncompressed tag list, proceed to step 1132.

In step 1130, get the next tag string from the list, and proceed to step 1122.

In step 1132, the MDC string is complete and ready to be encoded in accordance with step 616 of flowchart 600 in FIG. 6A, described elsewhere herein.

As described elsewhere herein, FIG. 11C shows flowchart 1150 illustrating the constructing of a compressed Item Reference in an example embodiment. In an embodiment of the invention, flowchart 1150 describes in detail the process of constructing a compressed Item Element in step 1126 in flowchart 1100. Flowchart 1150 is also marked 1126a to show this relationship with step 1126.

Flowchart 1150 starts with step 1152, leading zeros are truncated from the S/N. Some or all of the leading zeroes may be truncated. In an embodiment, all of the leading zeroes are truncated, and the number of leading zeroes dropped from each element is tracked. In another embodiment, some number of leading zeroes which can be truncated from each element is truncated. In yet another embodiment, a number of zeroes to be truncated is determined by other means. The number of truncated leading zeroes can vary for each tag.

In step 1154, a controlling row of Table 1430 (shown in FIG. 14C) is determined by comparing the current tag data with the prior tag data and finding the appropriate situation from first column of Table 1430. For the first tag, the default values may apply (e.g., may be able to use the partition, filter, etc.). However, all other values will need to be defined.

In step 1156, the SKU is appended to the MDC string unless it is reused for the current tag from the value in the prior tag. In this instance, if Item Start Value is 5, only the Item Reference is defined and the 13 digit SKU's Company Prefix is not encoded.

In decision step 1158, if the S/N start digit column of the controlling row of Table 1430 is "N", proceed to step 1164. If the S/N start digit column is "Y", proceed to step 1160.

In step 1160, Table 1440 (shown in FIG. 14D) is used to indicate the length of the S/N encoded into the MDC and indicate the number (0 or 2) two Truncation Digits encoding the number of leading zeroes and trailing digits truncated from the S/N. The number of S/N digits encoded only includes the number of digits actually encoded, and does not include the truncated leading and/or trailing digits truncated.

In step 1160, the S/N start digits and the truncation digits (if any) are appended to the MDC string in accordance with Table 1440.

In step 1162, the remaining S/N digits not truncated are appended to the MDC string. In an embodiment of the invention, this completes the constructing of a compressed Item Element as illustrated in step 1126 of flowchart 1100.

FIG. 14F shows table 1460 illustrating the resulting compressed list of the 12 case IDs (originally shown in table 1410 in FIG. 14A), in the "Compressed" column after an example embodiment of the invention, as illustrated by flowcharts 1100 and 1150 have been applied to the data in table 1410. Although shown on separate rows with added spaces for clarity, the compressed data would actually be encoded as a single continuous string of 81 digits: a total of 13 digits were required to encode the MDC header, and a total of 68 digits encoded the incompletely-serialized details of the 12 case items.

The complete compressed MDC data string in this example starts with the MDC header (FIG. 14E showing table 1450), followed by the digits in the Compressed Data column of Table 1460 (FIG. 14F). In the full fixed-length simulated format in this example, the uncompressed data, not counting the PC and Header bits and the last four digits used for the identifier, requires 78 bits, which can be represented in a 24-digit number. Without compression, the twelve truncated case IDs would require at least 288 digits, compared to 68 digits with compression.

Data string reconstitution is discussed elsewhere herein. During data string reconstitution, the MDC may need to be decompressed. For example, in step 706 of flowchart 700 (FIG. 7A, described elsewhere herein), a compressed MDC may be decompressed. Flowchart 1200 shown in FIG. 12A illustrates an example embodiment of the method to decompress a MDC compressed by a method that takes advantage of characteristics of the actual or anticipated data. In addition, FIG. 12B shows a flowchart 1250, when read with flowchart 1200 provides a specific example of an embodiment of the invention applied to a specific data structure. Other structural and operational embodiments will be apparent to persons skilled in the relevant art(s) based on the following discussion related to flowchart 1200 and/or 1250. The steps shown in FIGS. 12A and 12B do not necessarily have to occur in the order shown. The steps of FIGS. 12A and 12B are described in detail below.

Flowchart 1200 begins with step 1202. In step 1202, a MDC data string is received.

In step 1204, a MDC header of the MDC data string is parsed. As illustrated in table 1450, FIG. 14E, in an embodiment, the first digit of the MDC header represents the MDC format. The rest of the header is parsed and the defaults are determined, such as number of trailing S/N digits truncated, PC Bits, Header, Filter, Partition, and the number of leading zeroes truncated from S/N.

In step 1206, a next digit in the MDC data string is read. In the example illustrated in tables 1410-1460 in FIGS. 14A-

14F, the next digit represents the Item Start Value for the next tag. For the first tag, it represents the Item Start Value for the first tag.

In step 1208, the compressed Item Entry is deconstructed into an Item entry. FIG. 12B shows flowchart 1250, described elsewhere herein, illustrates an example embodiment. In other embodiments, other techniques may be used to construct the compressed Item Entry. In embodiments of the invention, the current compressed Item Entry is constructed based on the value of the previous uncompressed Item Entry.

In decision step 1210, if there are any more digits in the MDC string, proceed to step 1206. If not, then the decompression process is complete. Step 1212 is included in flowchart 1200 only to clarify what happens if there are no more digits in the string at decision step 1210. For example, in an embodiment of the invention, flowchart 1200 represents an expanded view of decompression step 706 in flowchart 700 (FIG. 7A), and the process would proceed to step 708.

As described elsewhere herein, FIG. 12B shows flowchart 1250 illustrating the decompression of a compressed Item Reference in an example embodiment. In an embodiment of the invention, flowchart 1250 describes in detail the process of decompressing a compressed Item Element in step 1208 in flowchart 1200. Flowchart 1250 is also marked 1208a to show this relationship with step 1208.

In step 1252, the current digit is the Item Start Value and is used to determine the controlling row of Table 1430 (FIG. 11C). In an embodiment, flowchart 1250 describes step 1208 in detail, therefore the current digit is the digit read by step 1206.

In step 1254, the filter, partition, header, and PC bits are parsed from the MDC string according to the controlling row of Table 1430 if the value in the "N extra digits" column is not zero. If N extra digits is zero, no digits are parsed in this step.

In step 1256, the SKU is parsed from the MDC string according to the controlling row of Table 1430 if the value in the "SKU digits" column is not zero. If SKU digits is zero, no digits are parsed in this step.

In decision step 1258, if the controlling row indicates there is at least one S/N start digit (indicated by a "Y" in the column), then proceed to step 1262. If there is a zero in the S/N Start Digit column, proceed to step 1260.

In step 1260, the next three digits are parsed according to the controlling row of Table 1430. For example, if the row with a "2" in the Item Start Value is the controlling row, then the current tag's filter, partition, header, PC bits, and SKU are the same as the prior tag's filter, partition, header, PC bits, and SKU (as decompressed from the MDC string). The S/N is also repeated with the exception of the last digit. The next digit of the MDC string is read and is inserted as the last digit of the current tag's S/N. Since this step is reached if Item Start value is 1-4, this step may read the next 0-3 MDC string digits. All fields are repeated from the prior decompressed tag except the last 0-3 S/N digits. At the end of this step, all of the current tag's data available on the MDC has been decompressed.

In step 1262, the next one or two digits are parsed from the MDC string according to Table 1440 column "S/N Start Digits." For example, if the first digit read is a value 0-7, then one digit is read. If the value is 8 or 9, then two digits are read.

In step 1264, Table 1440 is used to determine the number of S/N digits encoded into the MDC string. The digit(s) read is checked against the he "S/N Start Digits" column in table 1440. For example, if the first digit read is a 6, then 6 S/N digits will be parsed from the MDC string, and there will be 0 "Trunc. Digits encoded" and the default number of leading zeroes and trailing digits were truncated when the compressed MDC was created. If the first digit read is a 9, then the number of S/N digits encoded is the value of the next digit, which should be 0-7. In this instance, there will also be two "Trunc. Digits encoded", which represent the number of leading zeroes and trailing digits truncated from the tag's S/N. Therefore, if the first digit read was a 9, and the second digit read was a 6, then 8 (two "Trunc. Digits" plus six S/N digits) more digits will be parsed. The first digit is the number of leading zeroes to be replaced, the second is the number of trailing digits truncated (and encoded on a MRS, HRS, or CS), and the remaining 6 digits are S/N digits. At the end of this step, all of the current compressed Item Entry will have been deconstructed. In an embodiment, this would complete step 1208 in flowchart 1200.

Example Data String Reconstitution Operational Embodiments

FIGS. 7A-7C shows a flowchart 700 providing example steps for reconstituting all or part of the data stored on a tag from a plurality of any combination of representations (of zero or more each of HRSs, MRSs, CSs, and MDCs). The process involves resolving the data elements from the representations associated with the tag and generating a data string from the data elements, according to example embodiments of the present invention. Alternatively, the data elements may be combined to form the data string according to other example embodiments of the present invention. Other structural and operational embodiments will be apparent to persons skilled in the relevant art(s) based on the following discussion related to flowchart 700. The steps shown in FIGS. 7A-7C do not necessarily have to occur in the order shown. The steps of FIG. 7A-7C are described in detail below.

Flowchart 700 begins in step 702. In step 702, the first representation associated with a RFID tag is received. This representation may be a scanned MRS, a manually entered HRS, or a machine-read MDC as respectively shown by step 702a, step 702b, and step 702c in FIG. 7B. If the symbol is a CS, either step 702a or step 702b or both may be performed. If a MDC is read, it may be associated with more than one tag and may be input one time and its data stored for retrieval and use with each of a series of tags or input separately for each tag.

In step 704, the representation is resolved into at least one data element and stored. In an embodiment illustrated in FIG. 7A, some representations are resolved into data elements of which at least one is compressed. But data elements are not required to have been compressed.

In step 706, any compressed data elements are decompressed. For example, the counterpart decompression algorithm(s) to the compression algorithm(s) used with regard to flowchart 500 or flowchart 600 can be used in this step. Step 706 is not necessary for any data element that is not compressed.

In decision step 708, if there are any more representations associated with the tag, go to step 702 and repeat all prior steps for each representation remaining. If there are no more representations associated with the RFID tag, then proceed to step 710.

In step 710, a data string is generated from the data elements of all symbols associated with the RFID tag. Generation may include using the data elements to look up information in an external or internal database, shipping notices or information, or by applying other algorithms to decode encoded data. In another embodiment, step 710 may be supplemented by step 712 in FIG. 7C. In an example embodiment for step 712, the data elements for all of the representations associated with the RFID tag are combined. Combining may be comprised of concatenation, interleaving, any arithmetic or other logical function (e.g., bitwise OR, bitwise AND, addition, multiplication, modulus, etc.), or any combination thereof, or any other method of conjoining the data elements. In yet another embodiment, step 710 is replaced by step 712.

FIGS. 8A and 8B show a flowchart 800 providing example steps for an operator to perform for handling a failed RFID tag, according to example embodiments of the present invention. Other structural and operational embodiments will be apparent to persons skilled in the relevant art(s) based on the following discussion related to flowchart 800. The steps shown in FIGS. 8A and 8B do not necessarily have to occur in the order shown. The steps of FIGS. 8A and 8B are described in detail below.

Flowchart 800 begins in step 802. In step 802, the higher level of packaging (e.g., shipping container, case, or pallet) containing objects is being checked into receiving. As the package is brought into receiving, it passes through a portal and the RFID tags of the objects are interrogated. An information system (IS) compares the list of interrogated results to the shipping information received previously. Any failed RFID tags will be identified to an operator or automated system in this step.

In step 804, an operator or automated system finds or isolates the object associated with the failed RFID tag. In an embodiment, the objects are labeled with large HRSs or CSs with a large human readable component. In an embodiment, the system designer has chosen to segment the data such that the human readable portion contains a small number of digits facilitating reading and data entry. In this embodiment, the bulk of the information may be encoded in the MDC and/or the MRS preprinted or otherwise affixed to the object or associated tag. Thus, the operator can quickly visually identify the objects containing the failed RFID tag in step 804.

In step 806, the operator may verify the correct item was located by manually entering the HRS in an embodiment or the human readable portion of the CS in another embodiment. An automated system may employ a camera and Optical Character Recognition (OCR) software to achieve the same end. In these or other embodiments, the operator or automated system may scan the MRS or the machine readable portion of a CS to provide the verification. Step 806 is optional, and in alternative embodiments, step 806 is not performed.

In step 808, the operator or system inputs data associated with the failed RFID tag to reconstitute data from the failed tag. If the data is a MRS, MDC, or the machine readable portion of a CS, the operator or system may scan the data in step 808a. If the data is a HRS or the human readable component of a CS, the operator may manually enter the data in step 808b, or an automated system may employ OCR means for capturing the HRS. If the operator or system entered or captured some or all of the data in a previous step (e.g. step 806 verification), the previously entered data can be used and may not need to be reentered.

In embodiments, a plurality of representations (comprised of at least one symbol and zero or more MDCs) are associated with an object, but the representations do not contain all of the data elements needed to completely reconstitute the RFID information for each object and therefore may not be sufficient to uniquely identify each object. Example embodiments encoding unique or quasi-unique identifier information in addition to detailed contents were described above. In reconstituting the tag data in such embodiments, the data from the representations is combined with additional information external to the representations (e.g., a database or other inventory system files). The additional data from the database may include the serialized or non-serialized portions of the product identification, additional information needed to reconstitute the tag (such as the Filter or Partition bits in an EPC tag), or both.

In an embodiment, once a shipment of uniquely serialized objects (cases or items) has been received, the unique serialization information is now in the database of the inventory system of the receiver. Should a tag fail while a tagged object is in possession of the receiver, but after the completion of the receiving process, the SSCC corresponding to that particular object may often be no longer available, at least not until the object has been uniquely identified again, at which time a database lookup could determine the shipment code for that item. However, even in this situation, key-entering just the last few digits of the HRS (for example, the final group of four digits) will often suffice to uniquely identify an object from the set of objects currently in stock.

Furthermore, in many receiving systems the objects with failed tags are reliably isolated from those with working tags; for example, objects with failed tags may be diverted off a conveyor belt. In these systems, the likelihood is that only one of those multiple objects sharing the last few digits will have a failed tag, and thus the system can uniquely identify that object from its last digits through a process of elimination.

When multiple objects in stock (or in a new shipment) happen to share the same last few digits, the system may display to the operator a list of possible objects to select from. In a further embodiment, the system may prompt the operator to key enter the next-to-last group of digits (or alphanumeric characters) to uniquely determine the object. As another alternative, the operator may be prompted to enter or scan the SKU (which may be already present on the object in a standard bar code such as an ITF-14 or UPC), if the system determines that this additional information will help uniquely identify the object whose last few digits were just entered.

Other embodiments provide yet other alternatives for completing the unique identification when the trailing digits do not suffice. The operator may be prompted to scan or key-enter the error detection code (e.g., CRC) bits that may be optically represented on the object. Although embodiments mention CRC, CRC-16, or other error correction terms for illustrative purposes in the identification of objects, these embodiments are not limited to any specific error detection algorithm (e.g., checksum, CRC-x, any hash function, cryptographic algorithm, or any other algorithm used for error detection). Since current industry standards use CRC-16 or similar variations, embodiments are most naturally described using this language. The CRC can be represented in the HRS, MRS, or CS (or any combination thereof). The CRC can be any length. For example, CRC-16 is 16 bits or four hexadecimal or six octal characters. The CRC will often be much shorter than the typical twelve-to-fourteen digit SKU. Combined with the trailing few digits of the identifier, it will be nearly as effective as the SKU at uniquely identifying a single item.

In yet other embodiments, the system implements traditional inventory control at the SKU level, and the unique serialization portion of the tag's identifier is not required when reconstituting a failed tag. In these and other embodiments, the unique serialization data, typically but not always the least significant bits or digits of the identifier, may be omitted from the symbol(s) (MRS, HRS, or CS, or any combination). In these embodiments, once the available data has been obtained from the symbol(s), a non-serialized tag can be programmed (for example, using an all zeroes serial number). Alternatively, the tag's format may support a direct indication that the tag contains no unique serialization. For example, Generation 2 EPC tags can optionally indicate a partially-programmed tag, missing its serial number.

Flowchart 1000 in FIG. 10 is applicable to these and other related operational embodiments. Other structural and operational embodiments will be apparent to persons skilled in the relevant art(s) based on the following discussion related to flowchart 1000. The steps shown in FIG. 10 do not necessarily have to occur in the order shown. The steps of FIG. 10 are described in detail below.

In flowchart 1000, steps 802 through 808 were described above and are identical to those steps in flowchart 800, and are applied directly to the embodiments described above. In these embodiments, however, the data read in may not be enough to uniquely identify the object. In step 808, the operator or the system enters the identifier data (this is the identifier data 912 from FIGS. 9A-9C, see descriptions above) on the object. The identifier data may not be enough to uniquely identify the data in step 1010. Since the receiver's IS has received the detailed shipment contents (see FIGS. 9A-9C and descriptions), the system can check for the item or possible matches.

If there is not enough information to identify the object, then the system will get more data in step 1012. As described in the example embodiments above, embodiments of the system may prompt the operator to enter more data, choose from a selection of possible matches, or scan in more information. Once enough data is received (through manual entry, selection, scanning, etc.), a data string is generated for the object in step 1014.

In step 1014, a complete or incomplete tag may be generated (as described in the above embodiments), or the receiver may be satisfied with the reconstituted data, may treat it as a successful tag read, and may proceed with his usual processes.

Example Data Encoding/Decoding Of Existing Standards Operational Embodiments

Flowcharts 500 and 800 of FIGS. 5A and 8 respectively will be used to illustrate example embodiments of encoding and decoding tag data using existing data standards. Although this example uses the SSCC-96 standard data structure (as defined in the EAN.UCC General specifications) and a standard Code 128 barcode, one skilled in the art will recognize these techniques and principles can be applied to other tag and barcode formats.

FIG. 5A shows flowchart 500, illustrating the creation of a plurality of symbols associated with a tag according to example embodiments of the invention. As described in example embodiments in the sections above, the plurality of symbols may be later combined to reconstitute at least some or all of the tag data after a failed tag read. When an embodiment relates to a shipping container application, the container's label may carry a Code 128 barcode containing the Serialized Shipping Container Code (SSCC) as defined in the EAN.UCC General Specifications. This standard barcode inherently provides unique serialization of each shipment from a given supplier unique for a period of at least a year after shipment. This will be most, but not all, of the data required should a tag fail to be read. Therefore, a second barcode is used to regenerate the tag's data if the receiver has no prior knowledge about the shipper.

Flowchart 500 starts with step 502. In step 502, the bitwise contents of an RFID tag are received. In one embodiment, the data comes directly from reading the tag, but in other embodiments, the tag data is available from a database or from another application. In this example embodiment, the tag stores data according to the SSCC-96 data structure.

In step 504, the bitwise tag contents are segmented into two or more child data elements and the format is validated. In the current example, using a SSCC-96 data structure, the child data elements include the CRC-16, PC bits, EPC Header, Filter, Partition, Company Prefix, and Serial Reference. The first sixteen bits are the CRC-16. The next sixteen bits are the PC bits, of which the first 5 bits indicate the number of words of valid tag data that follow the PC bits, and the remaining eleven bits are all zeroes. The next eight bits are the EPC header, which, in the current example, are "00110001" denoting a SSCC-96 data structure. The next three bits are the "Filter" followed by the three bit "Partition."

A lookup of the Partition in the tag specification table divulges the number of bits (M) for the Company Prefix. The following (58 minus M) bits contain the Serial Reference. As an example, if the Company Prefix is "012345", then the length is six and the Partition is set to "110". When reading the tag, the Partition tells the reader that the next twenty bits contain the six digit Company Prefix, and the remaining 38 bits contain the Serial Reference. The next and last 24 bits in SSCC-96 data string are unused.

In step 506, these child data elements are optionally compressed. In this example, there is no compression, but the 24 unused bits are discarded, as are the sixteen CRC-16 bits, after being used to detect any errors.

In step 508, the child data elements are encoded into symbols. In the current example, a standard SSCC barcode and an auxiliary barcode will be produced. These barcodes may be MRSs or may be CSs, with human readable characters in addition to the machine readable barcode. The twenty digit SSCC data content begins with decimal "00" (denoting that it is an EAN.UCC SSCC data structure), followed by the first digit of the Serial Reference. The six digit Company Prefix (in the present example) follows, then the remaining Serial Reference digits. The final digit is a modulo-10 checksum digit. A Code 128 barcode is printed with a "Function 1" (FNC1) character in the first data position (denoting a Code 128 symbol compliant with the EAN.UCC system) followed by the twenty digit SSCC data content.

Step 508 may also include the encoding of the Partition and the Filter child data elements into the auxiliary barcode. This auxiliary barcode symbol may be a MRS or it may be a CS, including human and machine readable characters. In this example embodiment, the Filter will be "010" in accordance with the standard tag specification table, which denotes "Logistical/Shipping Unit." The partition value in the present example is "110" (i.e. binary 6). Since the partition value varies with the length of the Company Prefix, for any given company, this value does not change. Therefore, it is usually feasible to encode the Filter and the Partition as a preprinted symbol (auxiliary barcode) on the company's preprinted shipping label (along with the company's address and logo). In embodiments where this symbol is pre-printed, step 508 is complete. In other embodiments illustrated by this example, the auxiliary barcode will need to be created (e.g., the company requires shipping under several company prefixes of different lengths). In some embodiments, a standards organization may have created standards for tag backup data. For example, the Association for Automatic Identification and Mobility (AIM) assigns Application Indicators (AIs) to denote special uses of Code 128 symbols. If AIM denotes the digits 99 followed by FNC1 ("99<FNC1>") as an AI to denote auxiliary backup tag data for tags where the tag data structure type (and thus the tag header bits) can be deduced from an associated EAN.UCC barcode, this auxiliary barcode will start with "99<FNC1>". If AIM further designates the first digit following FNC1 to represent the Filter and the next digit to represent the Partition, the complete Code 128 symbol would be "99<FNC1>26" in the present example. This symbol may be printed as a MRS or as a CS with human readable characters.

As described above, FIG. 8 shows flowchart 800 for regenerating tag data from a plurality of symbols associated with a RFID tag, according to example embodiments of the present invention. Flowchart 800 is used here to illustrate the reconstitution of tag data after a failed tag read. Continuing the example of this section, the shipping container has been shipped and a tag read has failed at the receiving company.

In step 802, a failed tag read is detected by automated machinery or an operator. In this example, the operator is alerted by the IS system of the failed tag read, and in step 804, finds and isolates the associated object. In this example, optional step 806 is skipped.

In step 808, the data associated with the tag are input. First, the auxiliary barcode is scanned (or the human readable component of a CS is manually entered). In the continuing example of this section, the data string scanned or manually entered will be "99<FNC1>26". From the AIM Application Indicator of "99", the reader system can ascertain that the operator is reconstituting an EPCglobal tag's data from the data, will interpret the data in this context, and will be expecting at least one more standard EAN.UCC barcode to complete the needed data.

In the receiving facility, this auxiliary symbol, which includes information on the length of the Company Prefix, is typically printed or preprinted on the item in some proximity to the tag. However, in closed-system applications and other applications where this length is constant or otherwise known (perhaps because the receiving station only receives items from one vendor), the auxiliary symbol can be printed on a menu board or other label not associated with any one individual item or RFID tag. Moreover, in such embodiments and others, it may be preferable to key-enter the short auxiliary string of human readable digits, rather than scanning an auxiliary barcode. Furthermore, in embodiments that support a Graphical User Interface (GUI), it may be preferable for the operator to inform the system that he/she is about to regenerate tag data via a menu choice or similar means, and the auxiliary data could be supplied through the GUI.

Continuing step 808, the additional data in the decoded auxiliary symbol is parsed. By definition, the first data digit after the encoded Application Indicator and FNC1 denotes the three Filter Value bits, and these are stored. Again by definition, the next digit denotes the three Partition Value bits, and these are stored. Since the auxiliary barcode contains only this information by definition, the reader system will be expecting additional data from one or more barcodes yet to be scanned. If the reader hardware provides, directly or indirectly, a GUI, then the GUI may optionally prompt the operator to scan or key-enter the first EAN.UCC barcode to continue the operation of regenerating tag data.

Continuing step 808, the operator scans and decodes an EAN.UCC barcode (in this section's example, an SSCC symbol), and the reader software, aware that tag data reconstitution is in process, parses the decoded data and stores the relevant data items that were either encoded or could be inferred. The decoded data of this symbol begins with and FNC1 character followed by "00", which informs the reader that this is in fact an SSCC symbol formatted according to the EAN.UCC system, and thus only an EPCglobal SSCC-96 tag data structure could appropriately be constructed using this barcode. Therefore, the leading "00" can be directly translated by the reader into a tag Protocol Control (PC) bit pattern of C0hex, followed by a Header bit pattern "00110001" (meaning the tag data represents an EPCglobal SSCC-96, with a fixed length of six data words), and the "00" further indicates to the reader that no additional barcodes will be required after this one. These facts are recorded, and the corresponding PC and Header bit patterns are stored as the leftmost portion of the regenerated tag data, and parsing continues. Optionally, if it is desired to include the leading CRC-16 as part of the reconstituted tag data, the above-described patterns can be shifted before storing them, leaving two bytes free to the left, as a placeholder for a CRC-16 (the CRC is not calculated until all the data has been reconstituted).

The barcode data following the "00" is used in combination with the data from the auxiliary barcode to complete regeneration of the tag data. The 3-bit "filter value" and 3-bit "partition value" from the auxiliary barcode are stored as the first six bits to the right of the already-stored Header pattern. The first digit after the "00" in the SSCC barcode is temporarily saved as an "indicator digit", then the "partition value" from the auxiliary barcode is utilized as a lookup to determine how many of the next SSCC digits comprise the Company Prefix. In the example of this section, the lookup indicates that the first six digits after the Indicator Digit form the Company Prefix. The Company Prefix digits, interpreted as an unsigned integer, are converted to bits (20, in this example), and added to the right of the bits saved thus far. The remaining data digits of the SSCC (excepting the final digit, which is discarded) are interpreted as an unsigned integer, converted to bits (38, in this example), and added to the right of the bits saved thus far. Twenty four trailing '0' bits are added, to complete the 96-bit data structure. Optionally, a leading CRC-16 can now be calculated and added as a prefix the 96 bits, and the regenerated tag data is now complete. The reading system, preprogrammed to understand that a single EAN.UCC barcode starting with "00" provides complete serialization, knows data input is complete, and does not to prompt the operator for additional barcodes or other input. Thus, the complete tag data is reconstituted.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for reconstituting at least some radio frequency identification (RFID) tag data, comprising:
   (a) receiving a plurality of representations associated with identification data for an RFID tag and at least one manually entered human readable symbol (HRS), wherein each representation in the plurality of representations corresponds to a different subset of the identification data, such that the plurality of representations combine to form the identification data;
   (b) resolving the plurality of representations into a plurality of data elements; and
   (c) generating a data string using the plurality of data elements resolved from the plurality of representations.

2. The method of claim 1, wherein step (c) comprises: generating a data string related to the RFID tag data using the plurality of data elements.

3. The method of claim 1, wherein step (a) comprises:
scanning at least one machine readable symbol (MRS).

4. The method of claim 1, wherein step (a) comprises:
receiving data in electronic form from a database.

5. The method of claim 1, wherein step (a) comprises:
receiving at least one manually entered human readable portion of at least one combination symbol (CS).

6. The method of claim 1, wherein step (a) comprises:
receiving at least one Master Data Carrier (MDC).

7. The method of claim 1, further comprising:
(d) repeating steps (a), (b), and (c) for at least one additional RFID tag.

8. The method of claim 1, further comprising:
(e) prior to step (c), decompressing data elements.

9. A radio frequency identification (RFID) tag device, comprising:
a substrate;
an antenna on the substrate;
an electrical circuit on the substrate that includes identifying data for the RFID tag device, wherein the electrical circuit is coupled to the antenna and is capable of transmitting the identifying data in response to a request from a reader; and
a plurality of representations associated with the identifying data,
wherein each representation in the plurality of representations corresponds to a different subset of the identifying data of the RFID tag device, such that the plurality of representations combine to form the identifying, wherein at least one representation of the plurality of representations is an optical representation that is remotely located from the RFID tag device.

10. The RFID tag device of claim 9, wherein each representation of the plurality of representations is a machine readable symbol (MRS), a human readable symbol (HRS), or a combination symbol (CS).

11. The RFID tag device of claim 9, wherein at least one representation of the plurality of representations is positioned on the RFID tag device.

12. The RFID tag device of claim 9, wherein the plurality of representations comprises at least one Master Data Carrier (MDC).

13. The RFID tag device of claim 12, wherein the at least one MDC is associated with at least one other RFID tag device.

14. A method for reconstituting data associated with a RFID tag, comprising:
(a) detecting that an RFID tag read failed;
(b) locating an item associated with the RFID tag of the failed read;
(c) inputting data of a plurality of representations associated with identification data for the RFID tag of the failed read, wherein each representation in the plurality of representations corresponds to a different subset of the identification data, such that the plurality of representations combine to form the identification data; and
(d) reconstituting at least some of the data previously stored on the RFID tag of the failed read using the input data of the plurality of representations.

15. The method of claim 14, wherein step (c) comprises:
manually entering at least one human readable symbol (HRS).

16. The method of claim 14, wherein step (c) comprises:
scanning at least one machine readable symbol (MRS).

17. The method of claim 14, wherein step (c) comprises:
receiving data in electronic form from a database.

18. The method of claim 14, wherein step (c) comprises:
manually inputting at least one human readable portion of at least one combination symbol (CS).

19. The method of claim 14, wherein step (b) comprises:
verifying that the object was correctly selected.

20. The method of claim 14, further comprising:
(e) writing the reconstituted data to an RFID tag.

21. The method of claim 14, wherein the data reconstituted in step (d) comprises the product identification portion of the data previously stored on the RFID tag, but excludes the unique serialization portion of the data.

22. The method of claim 14, wherein step (d) comprises:
reconstituting at least some of the data previously stored on the RFID tag using the input data and information from another source.

23. The method of claim 22, wherein said reconstituting step comprises:
receiving the information in electronic form from a database.

24. A method of reconstituting radio frequency identification (RFID) tag data that identifies an RFID tag having a plurality of representations associated with identification data for the RFID tag, comprising:
resolving the plurality of representations into a plurality of data elements, wherein each representation in the plurality of representations corresponds to a different subset of the identification data, such that the plurality of representations combine to form the identification data, wherein resolving the plurality of representations includes resolving at least one human readable symbol (HRS); and
generating a data string using the plurality of data elements.

25. The method of claim 24, wherein resolving the plurality of representations includes resolving at least one machine readable symbol (MRS).

26. The method of claim 24, wherein resolving the plurality of representations includes resolving at least one combination symbol (CS).

27. The method of claim 24, wherein generating the data string is performed in response to decompressing compressed data elements.

28. A radio frequency identification (RFID) tag device, comprising:
a substrate;
an antenna coupled to the substrate;
an electrical circuit coupled to the antenna, the electrical circuit including identification data corresponding to the RFID tag device, wherein the electrical circuit is capable of transmitting the identification data in response to a request from a reader; and
a plurality of representations associated with the identification data,
wherein each representation in the plurality of representations corresponds to a different subset of the identification data, such that the plurality of representations combine to form the identification data, wherein the plurality of representations includes a human readable symbol (HRS).

29. The RFID tag device of claim 28, wherein each representation of the plurality of representations includes information pertaining to the identification data.

30. The RFID tag device of claim 28, wherein the plurality of representations includes a machine readable symbol (MRS).

31. The RFID tag device of claim 28, wherein the plurality of representations includes a combination symbol (CS).

32. The RFID tag device of claim 28, wherein at least one representation of the plurality of representations is an optical representation that is located remotely from the RFID tag device.

33. The RFID tag device of claim 28, wherein at least one representation of the plurality of representations is an optical representation that is coupled to the RFID tag device.

34. The RFID tag device of claim 28, wherein the plurality of representations includes at least one Master Data Carrier (MDC).

35. The RFID tag device of claim 34, wherein the at least one MDC is associated with at least one other RFID tag device.

36. A radio frequency identification (RFID) tag device, comprising:
   a substrate;
   an antenna coupled to the substrate;
   an electrical circuit coupled to the antenna, the electrical circuit including identification data corresponding to the RFID tag device, wherein the electrical circuit is capable of transmitting the identification data in response to a request from a reader;
   first means for representing information associated with the RFID tag device; and
   second means for representing information associated with the RFID tag device,
   wherein the first means and the second means correspond to respective portions of the identification data, such that the first means and the second means combine to form the identification data, wherein at least one of the first means and the second means is a human readable symbol (HRS).

37. The RFID tag device of claim 36, wherein the first means and the second means each represent information pertaining to the identification data.

38. The RFID tag device of claim 36, wherein at least one of the first means and the second means is a machine readable symbol (MRS).

39. The RFID tag device of claim 36, wherein at least one of the first means and the second means is a combination symbol (CS).

40. The RFID tag device of claim 36, wherein at least one of the first means and the second means is located remotely from the RFID tag device.

41. The RFID tag device of claim 36, wherein at least one of the first means and the second means is coupled to the RFID tag device.

42. The RFID tag device of claim 36, wherein at least one of the first means and the second means includes a Master Data Carrier (MDC).

43. The RFID tag device of claim 42, wherein the MDC is associated with at least one other RFID tag device.

* * * * *